(12) United States Patent
Hsiao

(10) Patent No.: US 10,897,643 B2
(45) Date of Patent: Jan. 19, 2021

(54) CONTENT STREAMING PLATFORM WITH DYNAMICALLY ARRANGED MEDIA CONTENT

(71) Applicant: Yu-Sang Hsiao, Missouri City, TX (US)

(72) Inventor: Yu-Sang Hsiao, Missouri City, TX (US)

(*) Notice: Subject to any disclaimer, the term of this patent is extended or adjusted under 35 U.S.C. 154(b) by 0 days.

(21) Appl. No.: 16/231,510

(22) Filed: Dec. 23, 2018

(65) Prior Publication Data
US 2019/0208257 A1 Jul. 4, 2019

Related U.S. Application Data

(60) Provisional application No. 62/611,372, filed on Dec. 28, 2017.

(51) Int. Cl.
| | |
|---|---|
| *H04N 7/173* | (2011.01) |
| *H04N 21/43* | (2011.01) |
| *H04N 21/488* | (2011.01) |
| *H04N 21/45* | (2011.01) |
| *H04N 21/482* | (2011.01) |
| *H04N 21/2743* | (2011.01) |
| *H04N 21/462* | (2011.01) |

(52) U.S. Cl.
CPC ..... *H04N 21/4307* (2013.01); *H04N 21/2743* (2013.01); *H04N 21/4532* (2013.01); *H04N 21/4622* (2013.01); *H04N 21/482* (2013.01); *H04N 21/4882* (2013.01)

(58) Field of Classification Search
CPC .......... H04N 21/4307; H04N 21/2743; H04N 21/4532; H04N 21/4622; H04N 21/482; H04N 21/4882
See application file for complete search history.

(56) References Cited

U.S. PATENT DOCUMENTS

| | | | |
|---|---|---|---|
| 9,998,518 B2* | 6/2018 | Lamb | G06F 3/04817 |
| 2007/0250901 A1* | 10/2007 | McIntire | H04N 7/17318 |
| | | | 725/146 |
| 2016/0156951 A1* | 6/2016 | Perinchery | H04N 21/4662 |
| | | | 725/14 |

\* cited by examiner

*Primary Examiner* — Mulugeta Mengesha
(74) *Attorney, Agent, or Firm* — Gregory M. MacDonald, Esq.

(57) ABSTRACT

One or more embodiments are directed to a system and method that includes receiving and storing a first created media content. The first created media content is synchronized with an existing media content by being associated with a first time within the existing media content, and the first created media content is playable for a first duration of time. The method also includes receiving and storing a second created media content. The second created media content is synchronized with the existing media content by being associated with a second time within the existing media content, and the second created media content is playable for a second duration of time. The first duration of time after the first time overlaps with the second duration of time after the second time. The method also includes generating an arrangement of media content.

19 Claims, 20 Drawing Sheets

CONTENT STREAMING PLATFORM WITH DYNAMICALLY ARRANGED MEDIA CONTENT

CROSS-REFERENCE TO RELATED APPLICATION

This application claims priority benefit to U.S. provisional patent application Ser. No. 62/611,372, which was filed on Dec. 28, 2017, which is entitled "Content Streaming Platform with Dynamically Arranged Media Content," and the entire contents of which is hereby incorporated herein by reference in its entirety for all purposes as if fully set forth herein, under 35 U.S.C. 119(e).

FIELD OF THE INVENTION

One or more embodiments of the present invention relate generally to a system and method for generating, storing, and playing an arrangement of media content by a content streaming/delivery platform, and, in particular, to a system and method of dynamically generating an arrangement of media content that is synchronized to an existing content.

One or more embodiments of the present invention can generate visual interfaces for content selection or interaction. Further, one or more embodiments provide interaction techniques based on graphical user interfaces for the control of specific functions or operations, e.g., the selecting or associating of an instance of media content with an existing media content at a specific time within the existing media content's timeline. Further, one or more embodiments can be directed to an end-user interface for requesting media content, additional data or services. One or more embodiments can be directed to an end-user interface for interacting with content, e.g., interacting with media content.

One or more embodiments of the present invention can be directed to a learning process for intelligent management, e.g., learning user preferences for recommending media content. One or more embodiments are also directed to a learning process for intelligent management, e.g., learning user preferences for recommending media content.

BACKGROUND OF THE INVENTION

A content delivery system is generally considered to be a distributed network of computing devices (such as servers, for example) that are deployed to serve content to viewers. The media content can be highly-available to the viewers via the content delivery system, and the content is generally provided to the viewers while meeting certain quality conditions.

Media content can be streamed to the viewer by the content delivery system. "Streaming" generally refers to delivering media content to the viewer by the content delivery system, where the media content is not necessarily completely downloaded before being provided to the viewer. The viewer can view the media content before the entire data file of the content has been transmitted to the viewer.

BRIEF DESCRIPTION OF THE DRAWINGS

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAIL DESCRIPTIONS OF THE INVENTION

Figure 1:
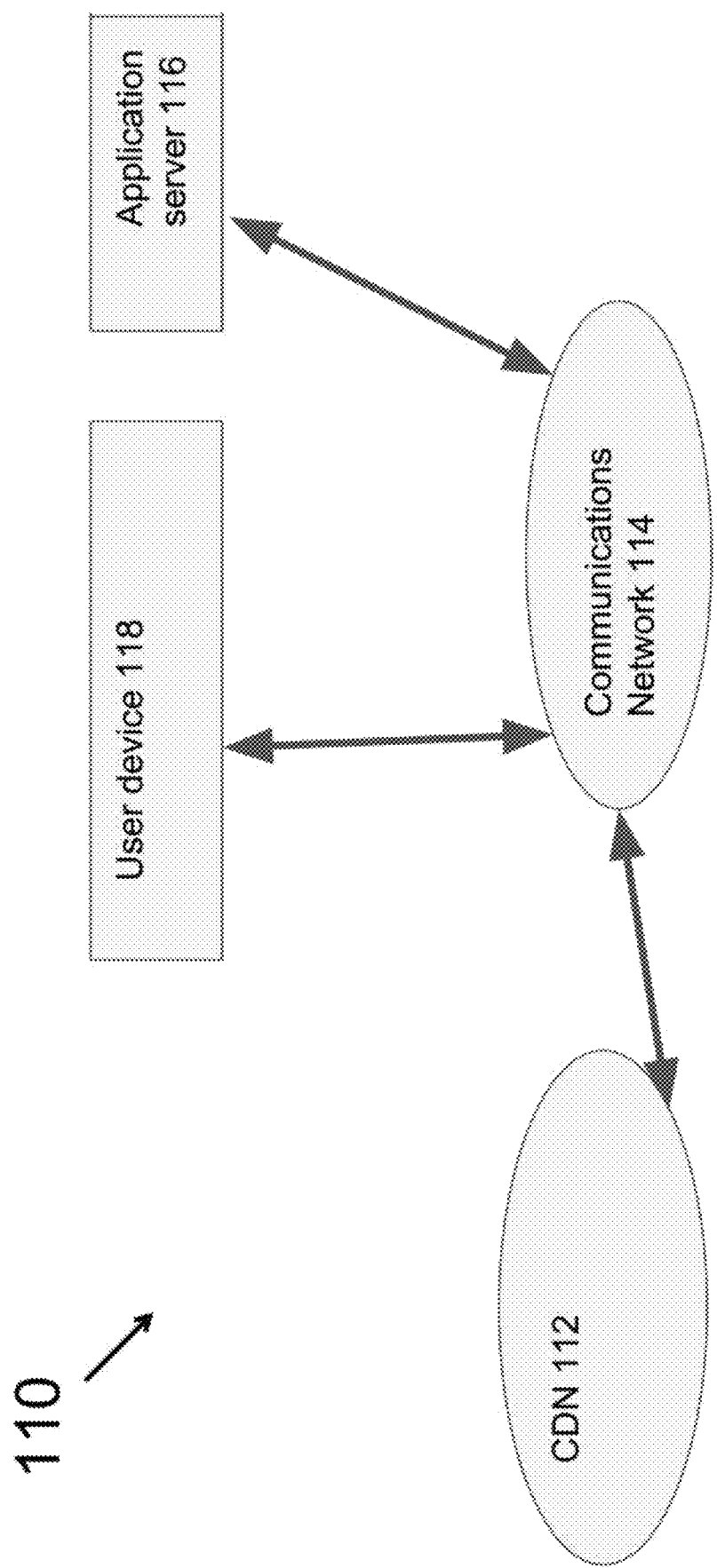
FIG. 1 illustrates a content distribution system that is configured to perform the functionality of one or more embodiments of the present invention.

One or more embodiments are directed to a content streaming system and method that dynamically generates an arrangement of media content, and, in particular, to a system and method of generating an arrangement of media content that is synchronized to an existing content. With one or more embodiments, the existing content can be content that has been previously recorded. The arrangement of media content can be displayed/played in conjunction with displaying/playing the existing content. For example, with one embodiment of the present invention, an arrangement of media content can be played in synchronization with an existing movie. The arrangement is configured to include portions of media content that are changeable. For example, the arrangement can be dynamically changed in accordance with at least one or more preferences of a viewer.

One or more embodiments can include a television system, where the television system can include, for example, a set top box, a media receiver, a screen/monitor, and/or one or more other components (such as, for example, an Apple TV device, a Slingbox device, etc.). One or more embodiments can include a computer system, where media is streamable over a network to a computing device. One or more embodiments can include a mobile computing device, where media is streamable over a network to the mobile computing device. One or more embodiments can include a content delivery system that transmits media content to a viewer, where the viewer utilizes one or more of the above-described display devices.

With one or more embodiments, the existing media content can be streamed from an authorized platform (such as Youtube™, Netflix™, Hulu™, music streaming services, etc.) that is authorized to stream the existing media content. The synchronized arrangement of media content can be streamed from another platform separate from the first platform. Thus, one or more embodiments can ensure that the displaying of the existing media content is authorized. Further, with one or more embodiments, the arrangement of media content can be played in association with the same instances of existing media content, regardless of what authorized platform is displaying the instance of existing media content. For example, the synchronized arrangement of media content can: (1) be streamed from a first platform in conjunction with a specific movie that is streamed from a second (authorized) platform, and (2) be streamed from the first platform in conjunction with the same specific movie that is streamed from a third (authorized) platform that is different from the second platform. Therefore, one or more embodiments can determine that an instance of existing media is played/displayed on the second authorized platform. One or more embodiments can then synchronize the arrangement of media content to this instance of existing media. One or more embodiments can determine that the same instance of existing media is played/displayed on the third authorized platform. One or more embodiments can then also synchronize the arrangement of media content to this same instance of existing media. Streaming of content is generally understood as an internet-centric problem. As such, one or more embodiments are directed to an inventive concept for resolving a particular internet-centric problem of dynamically arranging an arrangement of media content to be displayed in association with a streamed existing media content. The media content and the arrangement of media content can be transmitted via any type of information channel. One or more embodiments can transmit media content via the internet.

With the previous methods of displaying/playing media content in synchronization with a movie, the movie would typically be displayed with associated displayed subtitles, or the movie would typically be associated with director/actor commentary.

However, with the previous approaches, the arrangement of media that is played in synchronization with the movie is fixed and unchangeable. For example, with director commentary, the director generally records a single soundtrack that reflects the commentary, where the commentary is affixed as an unchanging, static soundtrack. The director's commentary will not be changed because the commentary will always serve the intended purpose of capturing the director's thoughts regarding the movie. Further, with regard to displayed subtitles, a Spanish-language subtitle will not be changed because the Spanish-language subtitle will always serve the intended purpose of interpreting the language of the movie to Spanish.

In contrast with the previous approaches, an embodiment of the present invention can generate, store, and play an arrangement of media content where the generated arrangement includes media content that is dynamically changeable/replaceable. Therefore, the changeable aspect of the arrangement of media content contributes to the rewatchability of the arrangement of media content and also contributes to the rewatchability of the existing media content to which the arrangement is synchronized to. As described in further detail below, the existing media content and the arrangement of media content can be delivered to the viewer via a content distribution system.

In further contrast with the previous approaches, with one or more embodiments, when portions of media content of the arrangement are played, the played portions of media content can affect the displaying/playing of the existing content. For example, when media content of the generated arrangement is played, the existing content can be momentarily paused, played at a slower speed, played at a lower volume, played without any volume, and/or momentarily rewinded to a certain point in time. The specific effect that playing of the arrangement's media content has on the existing content can be determined based on a configuration preference of the viewer and/or a configuration preference of the creator who submitted the media content that is included in the arrangement.

With another previous approach, a media content (i.e., such as a commercial) can be associated with an existing content, where the media content can be determined based on a location of the viewer. For example, an existing content can be streamed to a viewer, where the commercial can be determined based on a geographical position of viewer. Therefore, the viewer can see a commercial for a local business, for example. However, with this previous approach, the media content (that can be determined based on a geographical position of a viewer) is always played at a defined time. In other words, the media content is played at a fixed time relative to the existing content.

In contrast with this previous approach, one or more embodiments of the present invention can generate an arrangement of media content, where the position of each instance of media content (within the timeline of the existing content) is dynamically determined. Further, with one or more embodiments of the present invention, each instance of media content can possibly overlap with another instance of media content (where the duration of a first media content can overlap with the duration of a second media content). As such, in contrast to the previous approaches, one or more embodiments are directed to method for resolving overlaps in instances of media content, which is a problem that is not addressed by any previous approach.

FIG. 1 illustrates a content distribution system 110 that is configured to perform the functionality of one or more embodiments of the present invention. Referring to FIG. 1, the content distribution system 110 can include a content distribution network (CDN) 112, a communications network 114, an application server 116, and/or a user device 118. The communications network 114 can be configured to coordinate communication between CDN 112, the application server 116, and the user device 118.

User device 118 can include at least one of a set top box, a computing system, a television, and/or any other type of computing/communication device such as, for example, a mobile phone, tablet device, etc. User device 118 can include a display for displaying video/images and/or can include a speaker for playing audio. One or more embodiments of the present invention can use more than one user device at the same time. For example, an embodiment can display an existing content on a television while displaying a corresponding arrangement of media content (that is synchronized to the existing content) on a separate mobile device. As such, while a first viewer is watching the existing media on the television, a second viewer can watch the arrangement of media content on the separate mobile device. As such, in the event that the second viewer has already viewed the existing media content (and where the first viewer has not yet viewed the existing media content), the second viewer can still be entertained by the existing media content because the second viewer can view the corresponding arrangement of media content, while not disturbing the viewing experience of the first viewer. While the first viewer is watching the existing media on a first device, and while the second viewer is watching the arrangement of media on a second device, the timing between the playing of the existing media and the playing of the arrangement of media content (which has been synchronized to the existing media) can become decoupled. For instance, because the existing media content is continuously playing on the first device, while the second device is playing instances of media content that may be of differing duration than the portion of existing media content that was played, the playing of the existing media content can be ahead/behind in the timeline as compared to the corresponding playing of the instances of media content. As such, one or more embodiments can provide the second viewer with an option to re-couple the playing of the instances of arranged media content with the playing of the existing media. Therefore, if the playing of the existing media content is ahead in the timeline as compared to the corresponding playing of instances of media content, then the playing of instances of media content can be moved forward in time to match the playing of the existing content.

The application server 116 can be a server device that performs functionality defined by a hosted application. The application can include an interface for playing existing media content in conjunction with the arranged media content. The application can also include an interface for allowing a creator to submit media content that can be included within an arrangement. As such, one or more embodiments of the present invention can be directed to an improved user interface for computing devices. One or more embodiments can restrain the type of data that can be displayed in the interfaces. Further, one or more embodiments can display an arrangement of media content in association with an existing media content that the arrangement is synchronized to, where the arrangement of media content is dynamically arranged. One or more embodiments are directed to a specific manner of displaying an existing media content in association with an arrangement of media content, rather than using conventional user interface methods to generically display media content. One or more embodiments are directed to a specific improvement over conventional systems, resulting in an improved user interface for electronic devices.

Further, one or more embodiments are directed to systems and methods for displaying existing media in conjunction with the dynamically-arranged arrangement of media content, in a non-conventional manner, in order to more clearly display feedback and reactions to the existing media content. One or more embodiments of the present invention can be directed to dynamically arranging media content in association with an existing media content and displaying such arranged media content. Given this purpose, one or more embodiments of the present invention do not preempt future research and development—one or more embodiments of the present invention are directed to a specific configuration. The application server 116 enables a viewer at the user device 118 to browse through existing media content, browse through arrangements of media content, store viewer preferences, store viewer history, store viewer preferences, store viewer history, establish a connection to the user device 118, etc. A viewer can sign-in to a stored account when using user device 118. The application server 116 can enable a creator to use user device 118 to submit media content (where the media content is synchronized to an existing media), where the submitted media is eligible to be included within an arrangement. A creator who submits media content can also sign-in to a stored account as well.

One or more embodiments of the present invention are directed to a computer implemented method and apparatus for dynamically generating an arrangement of media content, where portions of media content within the arrangement can be changed, exchanged with other portions of media content, chronologically repositioned relative to one another in a timeline of an existing media content, repositioned in time relative to the existing media content, added, and/or removed. With one or more embodiments, the apparatus for generating the arrangement can be user device 118. In another embodiment, the apparatus for generating the arrangement can be application server 116. Other embodiments can generate the arrangement using a combination of user device 118 and application server 116. User device 118 and application server 116 can include one or more processors and a non-transitory computer readable medium. The apparatus for generating the arrangement can be a computer system. The computer system can store the generated arrangement of media content in the form of one or more data objects within the non-transitory computer readable medium. The computer system can be configured to arrange the portions of media content within the arrangement according to a defined sequence. The defined sequence of the media content within the arrangement can be in synchronization with an existing media content.

As described above, the arrangement of media content is not an unchangeable static arrangement. Rather, with one or more embodiments, the computer system can be configured to add, remove, replace, schedule, reschedule, and/or rearrange media content within the arrangement. Further, with one or more embodiments, the computer system can dynamically arrange the media content within an arrangement before or during display of the arrangement. Performing dynamic arrangement generally means considering inputs that determine the arranging, and performing the arranging at the time (or during the time) that the arrangement is displayed/played. As described in more detail below, the computer system of one or more embodiments can generate a user interface that receives viewer preferences, where the preferences can be used to determine the adding, removing, replacing, scheduling, rescheduling, and/or rearranging of content within the arrangement.

With one or more embodiments, the scheduling of each instance of media content can be dynamically arranged against the existing media content. In other words, the starting point and/or ending point of each instance of media content can be dynamically determined. With one or more embodiments, two or more instances of media content can overlap/conflict with each other (for a duration of time) as the arrangement is dynamically generated in synchronization with the existing media content. The overlapping/conflicting instances can be resolved by prioritizing one instance over another, for example. For example, one instance of media content can be played after the other instance of media content. In another embodiment, the prioritized media content can be used, while the other instance of media content is not used.

With one or more embodiments of the invention, the time of synchronization of an instance of media content can be dynamically changed at the time that the arrangement is dynamically generated. For example if a first instance of media content and a second instance of media content overlap with each other, and if the first instance of media content is prioritized over the second instance of media content, then the relative timing between the second instance of media content and the existing content can be dynamically changed where the second instance of media content is played after the prioritized first instance of media content. Further, with one or more embodiments, the relative timing between the first instance of media content and the existing media content can also be dynamically changed. With one or more embodiments, if the first instance of media content and the second instance of media content overlap, then both relative timings (of the first instance of media content and of the second instance of media content) can be changed to accommodate both the first instance and the second instance of media content to be included in the arrangement of media content.

With one or more embodiments, the computer system can be caused to simultaneously display the existing media content along with displaying of the arrangement of media content. The computer system of one or more embodiments can be caused to display a user interface that enables the displaying of the arrangement of media content in synchronization with the existing media content. With one or more embodiments of the present invention, the arrangement of media content and the existing media content can be displayed at the same time, but on different devices. For example, the existing media content can be displayed on a television, while the arrangement of media content can be displayed on a mobile device.

As described above, the apparatus of one or more embodiments can be configured to generate an arrangement of media content such that the arrangement is in synchronization with an existing media content. The existing media content can be existing video content (such as, for example, an existing movie, an existing news broadcast, an existing sports event, an existing webisode, an existing television show episode, and/or an existing clip of online video), or the existing media content can be existing audio content (such as, for example, an existing musical score, an existing audio recording, podcast, and/or radio program). The existing media content can also be a slideshow or an electronic presentation. Therefore, as the media content (of the arrangement) is played/displayed in synchronization with the existing media content, the media content of the arrangement can be related and/or responsive to the played existing media content.

For example, with one or more embodiments, the media content of the arrangement can include textual, pictorial, audio, and/or video content that is of a recorded viewer reaction to the portion of displayed existing media to which the media content of the arrangement is synchronized with. The media content of the arrangement can also include textual, pictorial, audio, and/or video content that is a recorded commentary regarding the displayed existing media to which the media content of the arrangement is synchronized with. With one or more embodiments, the media content of the arrangement can comprise textual, pictorial, audio, video and/or audio content that is user-generated content. The textual content can be a comment relating to the existing media content, for example.

Figure 2:
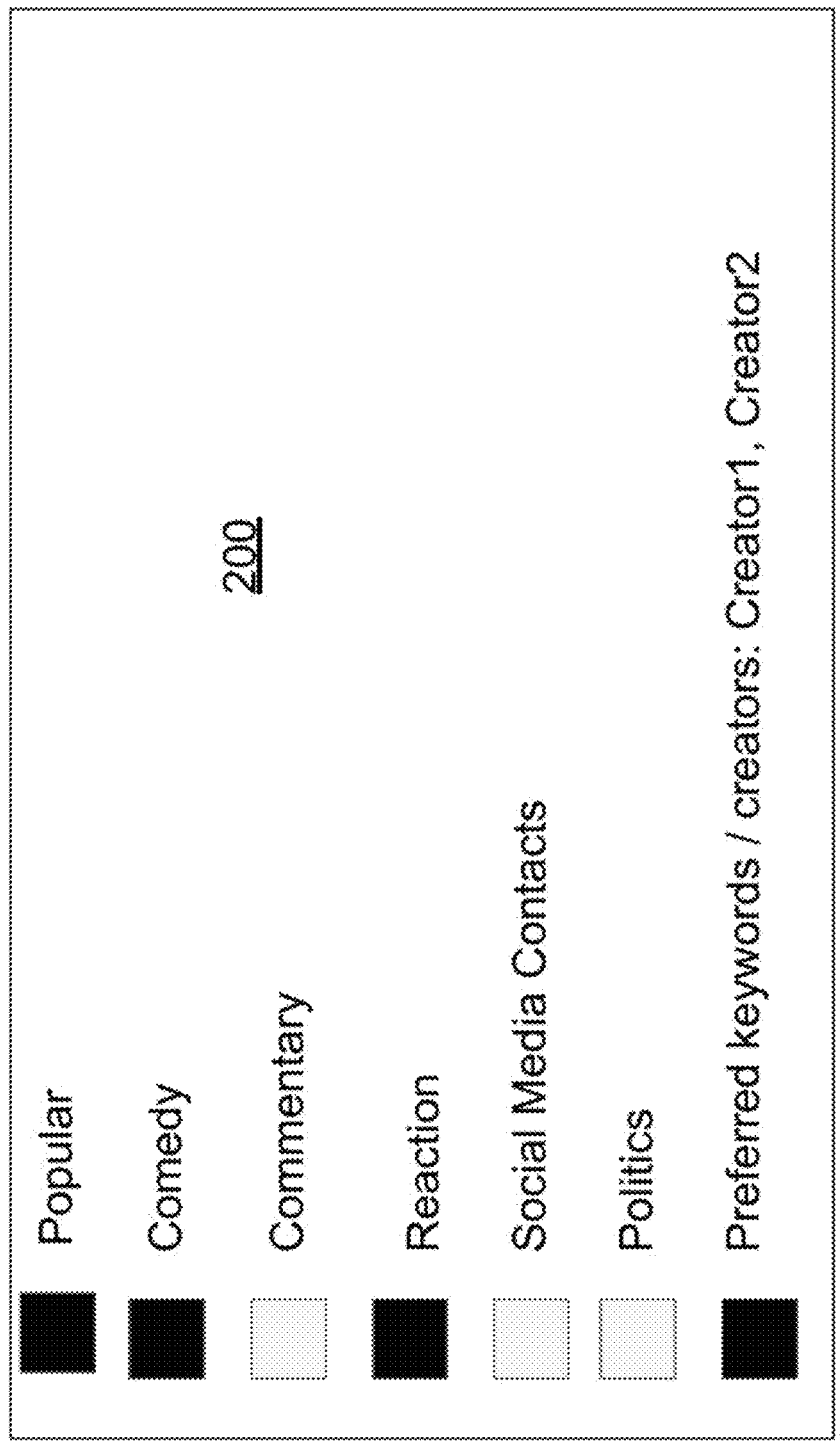
FIG. 2 illustrates an example user interface that is configured to allow a viewer to specify one or more viewing preferences in accordance with one or more embodiments.

FIG. 2 illustrates an example user interface 200 that allows a viewer to input viewer preferences in accordance with one or more embodiments. As described above, the computer system of one or more embodiments can generate a user interface 200 that is configured to receive inputs that determine the adding, removing, replacing, scheduling, rescheduling, and/or rearranging of content within the arrangement. The inputs can be viewer preferences or other user preferences, for example. The inputs can also be keywords that the viewer is looking for. The interface of one or more embodiments can be directed to an interface that enables synchronization of an arrangement of media content to specific points within an existing media content, which is an inventive concept that allows viewers to more clearly and readily ascertain reactions and feedback to specific points in time of the existing media content. The interfaces of one or more embodiments can operate together in an unconventional manner to achieve an improvement in computer functionality. Referring to FIG. 2, a viewer has used user interface 200 to indicate a preference for "popular" media content, "comedy" media content, "reaction" media content, and media content that is created by a list of preferred creators. "Reaction" media content can include recorded reactions to the existing media content. In the example of FIG. 2, the viewer has indicated a preference for media content that is created by "Creator1" and "Creator2". In the example of FIG. 2, the viewer has not indicated a preference for "commentary" media content, media content that is created by social media contacts, nor "politics" media content. In view of the preferences indicated by the viewer (for "popular," "comedy," "reaction," "Creator1," and "Creator2" media content), the computer system of one or more embodiments can configure an arrangement of media content for the viewer based on these expressed viewer preferences. Specifically, the media content that is included within the arrangement can be media content that meets one or more of the preferences indicated by the viewer.

The example user interface of FIG. 2 enables a viewer to specify one or more viewing preferences in accordance with one or more embodiments. A user who views the arrangement can store preferences regarding the type of media content that the arrangement of media content should contain. For example, in one or more embodiments, the computer system can receive and store a set of preferences from the viewer that reflects the viewer's preferred content. For example, in one example embodiment, the computer system can receive and store a preference from the viewer that reflects that the viewer prefers media content that is serious commentary. In another embodiment, the viewer can indicate a preference for media that is considered to be a reaction video. The viewer can also indicate a preference for media that has been generated by certain friends, or "liked" by certain friends, of the viewer's social network, for example. As such, the computer system of one or more embodiments can receive data from a social network application regarding the viewer's friends.

The computer system of one or more embodiments can also receive and store preferences that reflect that the user/viewer has a preference for media content that has been generated by a specific user or a specific type of user. The computer system can store a viewer's preference for content created by a specific member of a social network, for example. Also, with one or more embodiments, the viewer can indicate a preference for media that has been generated by a particular celebrity or a particular commentator, for example. The viewer can also indicate a preference for media content that has been associated with certain metrics such as, for example, metrics that indicate that the content is the most popular, the most "liked," and/or the recipient of the most attention. The viewer can also indicate a preference for media content based upon a time that the media was submitted. For example, the viewer can indicate a preference for media that has been most recently been submitted, or indicate a preference for media content that was submitted the earliest. The viewer can also indicate any of the preferences via an interface, for example, and the indicated preferences can be stored by the computer system. The computer system of one or more embodiments can receive and generate an arrangement of media content based on the stored preferences of the viewer, before, during, and/or after viewing the arrangement of media. The preferences of the viewer can be input into a computer-implemented algorithm that can determine an arrangement of media content.

As described, one or more embodiments can also determine content that is to be included in a viewer's arrangement of media content in accordance with input that is provided by the viewer. For example, the user can input a keyword, descriptive phrase, and/or hashtag that can be stored by the computer system, and the stored data can be used to filter the content that is to be included in the arrangement for the user. The user can also further filter the user-generated content by maturity level. For example, the user can choose to allow the computer system to display all types of audio/video, or the user can choose to only display audio/video that are appropriate for younger age groups.

A computer-implemented algorithm of one or more embodiments can select the media content (to be included in a viewer's arrangement) based on, but not limited to, the viewer's preferences, metrics that indicate a media content as being popular, metrics that indicate a media content as yielding a greater profit, and/or metrics that indicate a media content as being uploaded more recently, etc. In other words, one more embodiments can automatically utilize an algorithm to dynamically determine the media content that should be arranged within the arrangement, to be played in synchronization with the existing media content.

In view of the above, the computer system of one or more embodiments can change the media content of the arrangement based upon, at least, changing preferences of the viewer and/or the changing characterizations of the media content (i.e., the changing popularity of the media content, the changing time that has elapsed since the media content was submitted, and/or the changing status of the user who generated the media content within the social network of the viewer, etc.). Therefore, the arrangement of media is not a fixed, static arrangement. Rather, the computer-implemented method can automatically and dynamically change the arrangement of media based on different inputs, at the time that viewing of the arrangement commences and/or while viewing occurs. For example, the arrangement of media content can dynamically change as feedback/input is received from the viewer in real-time as viewing occurs, as described in more detail below.

Further, one or more embodiments can dynamically arrange media content within an arrangement based on media that is recommended by the system to the viewer. For example, the system can determine one or more correlations between what the present viewer enjoys and what other viewers have enjoyed. The system can then recommend media content that is to be included within the viewer's arrangement based on the determined correlations. In general, one or more embodiments can learn which media that the viewer enjoys and can present such recommended media to the viewer within the viewer's arrangement of media content.

Figure 3:
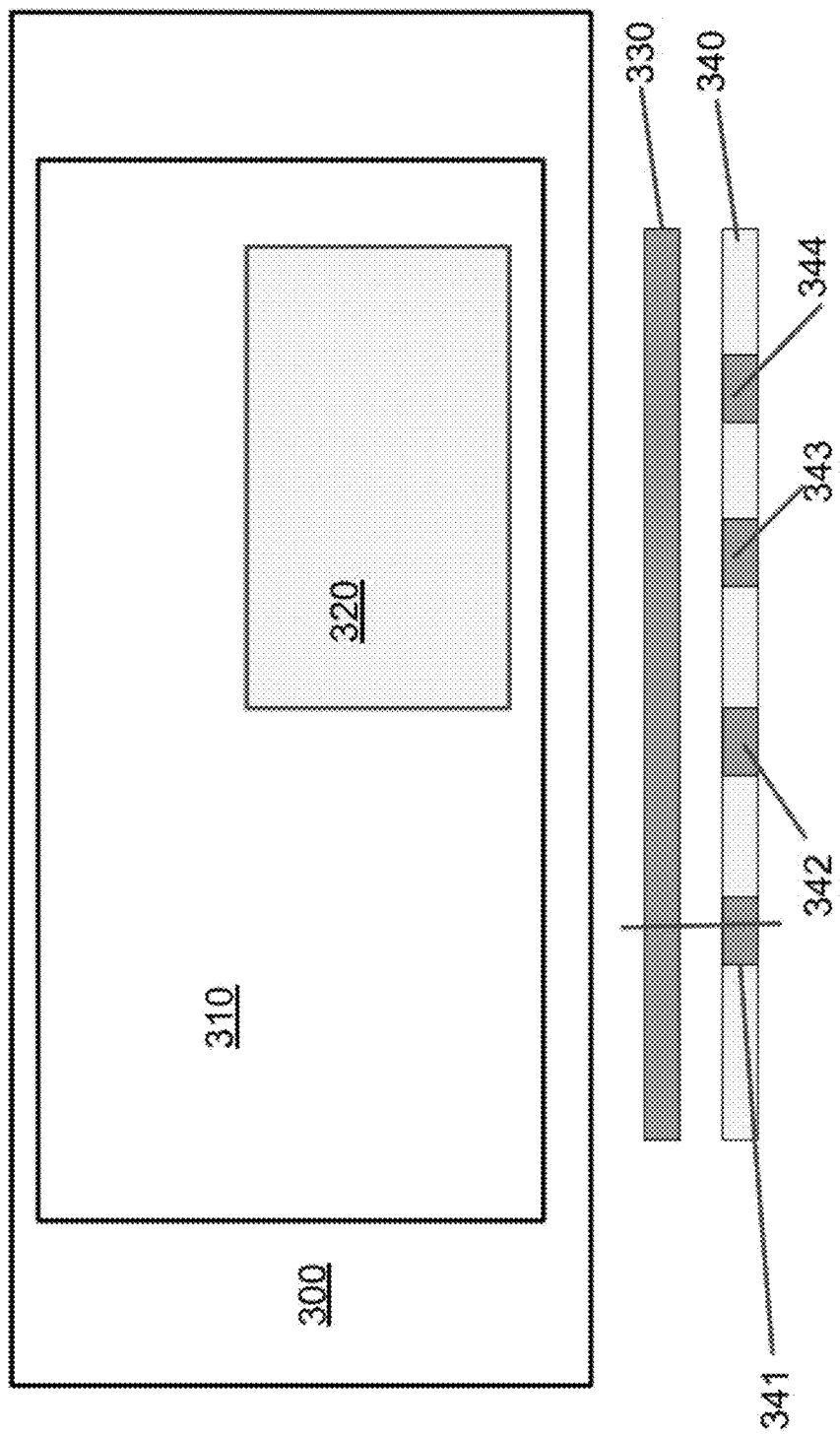
FIG. 3 illustrates an example interface for displaying/playing an arrangement of media content in conjunction with existing content.

FIG. 3 illustrates an example user interface 300 that allows a viewer to play a generated arrangement of media content in synchronization with an existing media content in accordance with one or more embodiments. Although FIG. 3 illustrates a user interface that displays the existing media content along with displaying of the arrangement of media content, other embodiments can display an existing media content on a first device, while displaying the arrangement of media content on a different, second device. The viewer may or may not be a same user as the creator that submits media content to be included within arrangements of media content. Within user interface 300, existing media content can be played within window 310. Existing media can be played within window 310 in accordance to a timeline 330. Media content from a generated media arrangement can also be played (in synchronization with the existing media) within window 320. As described above, the portions of media content (341, 342, 343, and 344) of the arrangement can be dynamically included within the viewed arrangement based on the viewer preferences indicated within user interface 200 of FIG. 2. For example, portion of media content 341 can correspond to a media content that has been tagged as "Comedy," portion of media content 342 can be a "Reaction" media content, portion of media content 343 can be media content created by "Creator 2," and portion of media content 344 can be media content created by "Creator 1," for example.

Example interface 300 is configured to display/play the arrangement of media content in conjunction with the playing of the existing content. As described above, with one or more embodiments, the computer system of one or more embodiments can display the arrangement of media content in synchronization with display of the existing media content, as the existing media content is played according to timeline 330. As described above, the computer system of one or more embodiment can synchronize the arrangement of media content with the existing media content.

With one or more embodiments, interface 300 can also allow a viewer to enable/disable display of the arrangement of media content. The option can be stored. The viewer can turn the displaying on or off. If the displaying of the arrangement of media content is allowed, one or more embodiments can automatically synchronize playing of the existing media with the playing of the arrangement of media content.

As the computer system of one or more embodiments synchronizes the playing/displaying of the arrangement of media content along with the playing/displaying of the existing media content, if a viewer decides to rewind, fast forward, skip ahead, and/or skip back, when viewing the existing media content (by interacting with timeline 330, for example), one or more embodiments of the present invention will also rewind, fast forward, skip ahead, and/or skip back, respectively, when displaying the arrangement of media content. With one or more embodiments, when the existing media content is played, the viewer can be presented with the option of displaying the arrangement of media content.

One or more embodiments can modify the display of the arrangement of media content and/or the display of the existing media content so that their displaying of both will not interfere with each other. For example, the computer system of one or more embodiments can implement "voice ducking," such that when both audio of the arrangement of media content and the audio of the existing media content are played at the same time, one or more of the corresponding volume levels are changed such that the audio of the of the arrangement of media content can be clearly heard over the audio of the existing media content. Alternatively, one or more embodiments can be configured so that the audio of the existing media content is heard over the audio of the arrangement of media content. With one or more embodiments, the computer system of one or more embodiments can temporarily mute the audio of the existing media content so that the audio of the arrangement can be clearly heard by the viewer. Further, one or more embodiments can modify the displaying of the existing media by slowing, skipping back or skipping forward, or fast forwarding the existing media, while the existing media is displayed in conjunction with an instance of media content (of the arrangement of media content).

With one or more embodiments, at a time of displaying/playing the arrangement of media content along with the existing content, if media content of the arrangement is associated with the specific play time, the video of the media content can be shown instead of the existing media content. In other embodiments, the video of the media content can be shown as an overlay over the video of the existing media content. In other embodiments, the video of the media content can be shown in a separate window. In other embodiments, the video of the media content can be shown as a picture-in-picture format.

With one or more embodiments, as described above, displaying/playing the arrangement of media content along with the existing content can momentarily pause the existing content. For example, the arrangement of media content can include an instruction that causes the existing content to be momentarily paused while a portion of the arrangement of media content is displayed/played. The portion of the arrangement can be displayed/played while the existing content is paused. Once the portion of the arrangement of media content is finished being displayed/played, the arrangement can include another instruction that causes the existing content to resume playing.

With one or more embodiments, when media content of the arrangement is displayed in conjunction with the displayed existing media content, an indication is also displayed that shows the user/creator who submitted the media content that has been included within the arrangement. Therefore, the viewer will be able to apprehend who is submitting the media content that has been included within the viewer's arrangement. As such, one or more embodiments can allow the viewer to know the user/creator who submitted the media, and thus the viewer can subscribe to the indicated user/creator. The indication can be a thumbnail of the user/creator, or the indication can be a name of the indicated user/creator, for example.

With one or more embodiments, when media content of the arrangement is displayed in conjunction with the displayed existing media content, the viewer can input a "like" or a "dislike" indication regarding the displayed media content. For example, the viewer can provide the indication via a remote controller or via another input device, for example. Upon receiving the "like" or "dislike" indication from the viewer, one or more embodiments can save the indication and use the saved indication to determine the preferences of the viewer. One or more embodiments can also configure the computer system to automatically and dynamically modify the media content within the arrangement that has not yet been viewed by the viewer, in accordance with the input from the viewer, for example. In other words, upon receiving the "likes" and "dislikes," one or more embodiments can utilize an algorithm to determine which types of content the viewer likes and which type of content the viewer dislikes. The computer system of one or more embodiments can then adjust which content is arranged within the arrangement.

With one or more embodiments, the computer system can be configured to display an interface that allows a viewer to adjust the amount of media content that the viewer wants to see from the arrangement of media content. For example, if the viewer is more selective about what media content is displayed alongside the existing media content, then the viewer can select a setting that displays media content of an arrangement infrequently. With one or more embodiments, such a setting can also cause the computer system to dynamically remove portions of media content from an arrangement of media content. On the other hand, if the viewer is interested in seeing more media content from the arrangement, the viewer can select a setting that causes the computer system to display media content of an arrangement more frequently. With one or more embodiments, such a setting can cause the computer system to dynamically add portions of media content to an arrangement of media content. As such, one or more embodiments can receive a selection from the viewer via a user interface, and the selection can be saved as data object by the computer system.

With one or more embodiments, the computer system can display an advertisement before, during, or after the displaying of the media content of the arrangement. Revenue accrued from the advertisement can be distributed among the creators who submitted the media content that was included within the displayed arrangement. The advertisements can correspond to advertisers who are associated with certain creators who submitted media content, for example.

Additionally, as described above, with one or more embodiments, the playing of the arranged media content can affect the playing of the playing of the existing content. Because the playing of the arrangement can affect the playing of the existing content (e.g., slow down the existing content, fast-forward the existing content, rewind the existing content, stop the playing of the existing content), the playtime of the existing content can be possibly lengthened or shortened. One or more embodiment can allow a viewer to designate a threshold time for which the existing content should be played. For example, the viewer can designate that the playing of the existing content should be within 2 hours, 3 hours, etc. Alternatively, the viewer can designate that the additional playtime should not exceed 30 minutes, or should not exceed a designated percentage of the original playtime of the existing content.

Figure 4:
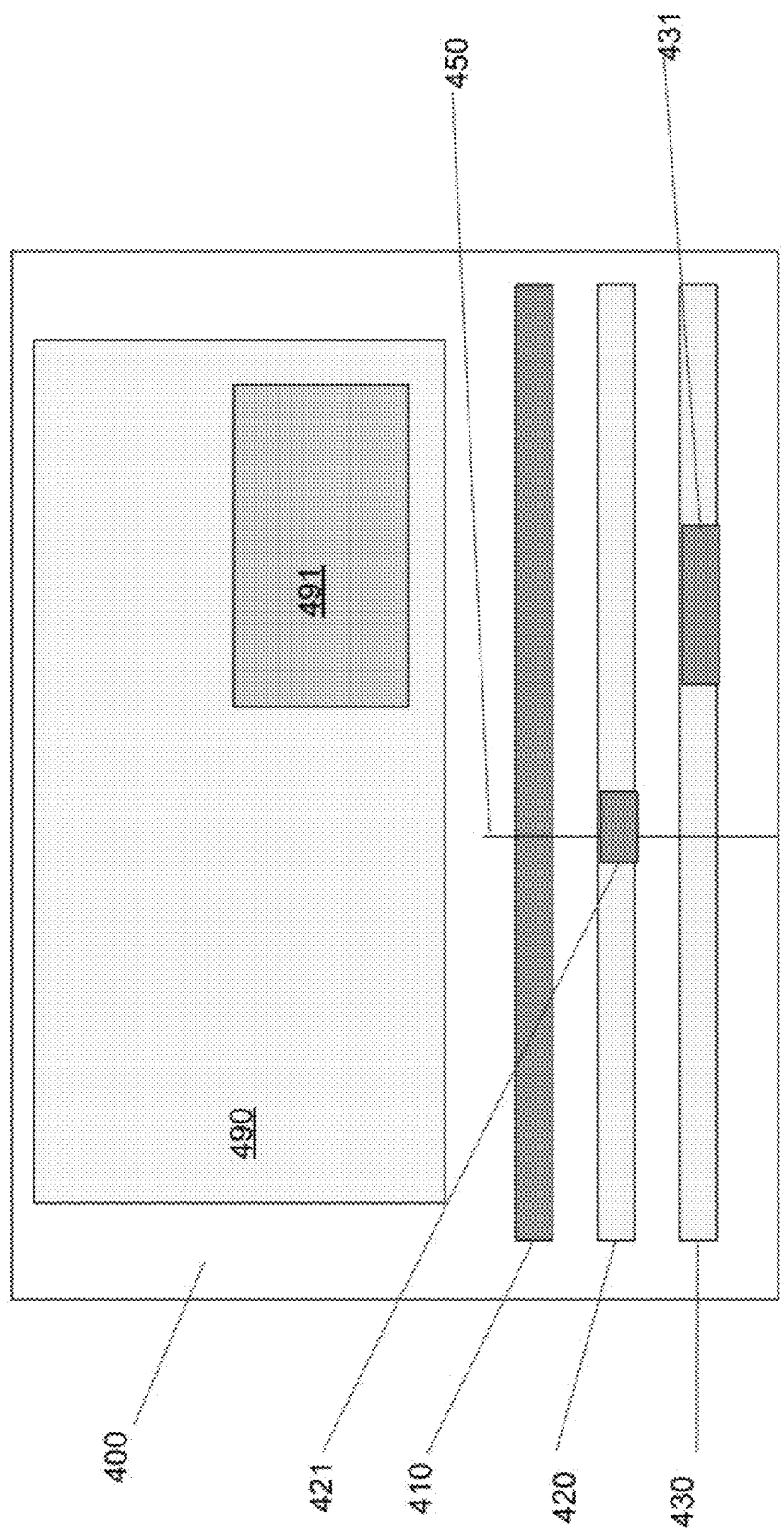
FIG. 4 illustrates an example user interface that allows a creator to submit media content to be included within an arrangement.

FIG. 4 illustrates an example user interface 400 that enables a creator to submit media content that is eligible to be included within an arrangement in accordance with one or more embodiments. With one or more embodiments, the submitted media content can be text, picture, video, and/or audio. The submitted media content can also correspond to a comment that is left for the existing media content. With one or more embodiments, the computer system can allow a creator to associate each portion of media content that is submitted with a specific synchronized time within the existing media content. For example, a creator can submit a video commentary that is associated/synchronized with a time of 20 minutes, 34 seconds from the beginning of the existing media content. With one or more embodiments, a creator can submit media content, can associate the submitted media with an existing media, and can synchronize the submitted media to a specific time within the existing media. With one or more embodiments, a creator can submit media content that is associated with the existing media but is not associated to any specific time within the existing media. As such, one or more embodiments can position this submitted media content (that is not associated with any specific time) within the arrangement, without overlapping any instance of synchronized media content that is within the arrangement. With one or more embodiments, each instance of submitted media content (that is not associated with any specific time) can be arranged at the earliest timeslot that does not interfere/overlap with any instance of synchronized media content that is within the arrangement. With other embodiments, instances submitted media content can be distributed throughout the arrangement in order to attempt to evenly distribute instances of media content throughout the timeline of the existing content. For example, one or more embodiments may want to try to evenly distribute media content (by duration or by number of instances) between the first half and the second half of the existing media content. One or more embodiments can also try to evenly distribute media content between the thirds, fourths, fifths, sixths, etc., of the existing media content. In other words, one or more embodiments can divide the existing media content into subdivisions, and one or more embodiments can distribute the instances of unsynchronized media content within the subdivisions to be as evenly distributed as possible.

Further, with one or more embodiments, a creator can indicate a time flexibility for when the submitted content is to be played. For example, in the example above, suppose that a creator submits content that is associated with a time of 20 minutes, 34 seconds into the existing media content. This creator can provide an indication that the content can be played 30 seconds before and/or 30 seconds after the designated time of 20 minutes, 34 seconds. As such, when arranging media content within an arrangement, where a plurality of media content occupy a same time period, content that has a greater time flexibility can be rearranged around content that has smaller time flexibility. One or more embodiments can provide a default time flexibility. The time flexibility can provide a specific improvement to the way that the computer system operates, by allowing more content to be accommodated for within the dynamically arranged arrangement of media content. By including a time flexibility in association with each instance of media content, one or more embodiments can dynamically fit more instances of media content within an arrangement, while also ensuring that each instance of media content is relevant to the existing media content that each instance of media content is synchronized to. As such, certain embodiments are directed to a specific method of displaying information that provides benefits that improve computer functionality.

As such, an arrangement of media content can include content that has been submitted by one or more creators. For example, referring again to FIG. 3, the arrangement of media content that is played in interface 300 included media content that was submitted by "Creator1" and "Creator2." As such, referring again to FIG. 4, the computer system of one or more embodiments can be configured to generate a user interface 400 that allows creators to submit media content that is eligible to be included in an arrangement of media content for a viewer.

As described above, user interface 400 can enable the creator to associate submitted media content with the existing media content (i.e., the existing media content to which the submitted media content should be synchronized with), and the creator can also associate the submitted media content with a point in time within the existing media content. As each media content is submitted by the creator, the computer system of one or more embodiments can create/modify a data object/file (that stores the arrangement) to reflect the association between the creator's content and the existing media content, as well as reflect the association between the creator's content and a point in time within the existing media content. Therefore, as creators submit their commentary and/or reactions to the existing media content, the commentary and/or reactions can be synchronized to the portion of existing media content that the commentary/reactions relate to.

Referring again to the example interface 400 of FIG. 4, window 491 of interface 400 can display the submitted content that is to be played in synchronization with existing media content. Existing media content can be shown in window 490. Interface 400 can also include a plurality of timelines (410-430), where a first timeline 410 corresponds to a timeline of the existing media that is displayed in window 490. In this example, a second timeline 420 can be a timeline to which the creator can submit video content. A third timeline 430 can be a timeline to which the creator can submit a different type of content such as, for example, audio commentary/soundtrack. By referencing both window 490 and window 491, a creator can determine whether the submitted content is synchronized properly with the existing content when both are played. The creator can submit and synchronize a submitted media content to the existing media content by dragging media content into example interface 400, and by positioning the dragged media content within an appropriate timeline (such as timeline 420 or timeline 430, for example). Different types of media can appear on different timelines, where each media is displayed at the time that is reflected by the respective timeline. For example, at the time corresponding to time instance 450, the creator has designated that a portion of media content 421 from timeline 420 is to play in conjunction with the existing media.

In one example embodiment, the user interface displays at least one timeline that allows submitted media content to be positioned against the existing media content. In one embodiment, the existing media content can appear in one timeline, and the submitted media can appear in another timeline. The existing media content can correspond to a timeframe within its timeline. The submitted media can correspond to another time frame within another timeline, for example.

The user interface can also configure the existing media content as a timeframe, where different times can be selected within the timeframe. Each selectable time within the timeframe of the existing media content corresponds to an instant of time within the existing media content.

The creator can select different times within the timeline/timeframe of the submitted content. Window 490 of user interface 400 can function as preview pane that shows what portion of existing media is shown at a selected time. Window 491 can also show the portion of the submitted media that is shown at the selected time. Therefore, one or more embodiments allow a creator to position the submitted media content relative to the existing media. The positioned (submitted) media content will then be associated with a particular position/time within the arrangement, which also corresponds to synchronizing the positioned media content with the existing media content.

One or more embodiments are directed to a user interface that is configured to allow a creator to submit/upload their content based on defined categories. The defined categories can include some of the above-described viewer preferences, for example. With one or more embodiments, the creator can tag the submitted content with different keywords. With one or more embodiments, the user interface can be configured to allow a creator to define their own categories based on one or more keywords or hashtags.

As described above, user interface 400 can also show one or more timelines (i.e., 420 and 430), where each timeline corresponds to a category of content (i.e., "commentary," "humor," trolling," "reaction," "animated gif," etc.). As such, one or more embodiments can be configured to allow a creator to designate which category submitted media belongs to, based upon which timeline the creator positions the submitted media into. Therefore, a particular creator can submit content that is characterized by different types.

With one or more embodiments, user interface 400 can be configured to allow a creator to submit media content by dragging and dropping the media content into a particular timeline and then drag the media content within the timeline for proper positioning.

One or more embodiments can also include an interface that enables creators to record direct commentary that is eligible to be included within an arrangement. For example, with one or more embodiments, an interface allows users to record commentary while the existing media is playing in real-time. Therefore, the recorded commentary is synchronized with the existing media.

Once the direct commentary is recorded, the recording may appear as an extended audio clip within a timeline. One or more embodiments can perform segmentation of the audio clip based upon breaks in the commentary. For example, the segments can correspond to the sentences spoken by the creator, where different spoken sentences are included in different segments. The silence in the commentary can be removed from the segments. Each segment can thus be converted into a separate media portion that is eligible to be included within an arrangement. Within the arrangement, other media can be displayed/played in between spoken sentences.

Although certain embodiments enable creators to directly choose when to record media content (which can then be eligible to be included within an arrangement), other embodiments can be directed to a recorder that automatically records the creator at predetermined times. For example, one or more embodiments can determine an exciting, dramatic, or surprising scene in the existing media content. With one or more embodiments, a manager of the existing media content can designate which times the recorder should begin recording, or other users/viewers can designate which times the recorder should begin recording.

At this determined exciting, dramatic, or surprising scene (in the existing media content), one or more embodiments can transmit an instruction to the recorder to begin recording the creator in order to capture the creator's natural reaction. Because the creator can be unaware that the recorder is recording, the creator's response to the scene can be more natural. The creator can then later review the captured video of the natural reaction, and the creator can submit the captured video to be possibly included within an arrangement. One or more embodiments can allow a creator to enable or disable the feature of automatic recording. Also, the recorder can include an indicator that indicates when the recorder is or is not recording.

With one or more embodiments, user interface 400 can also display analytics regarding the viewing of each portion of submitted content. The analytics can include views, likes, and dislikes of each portion of submitted content.

Figure 5:
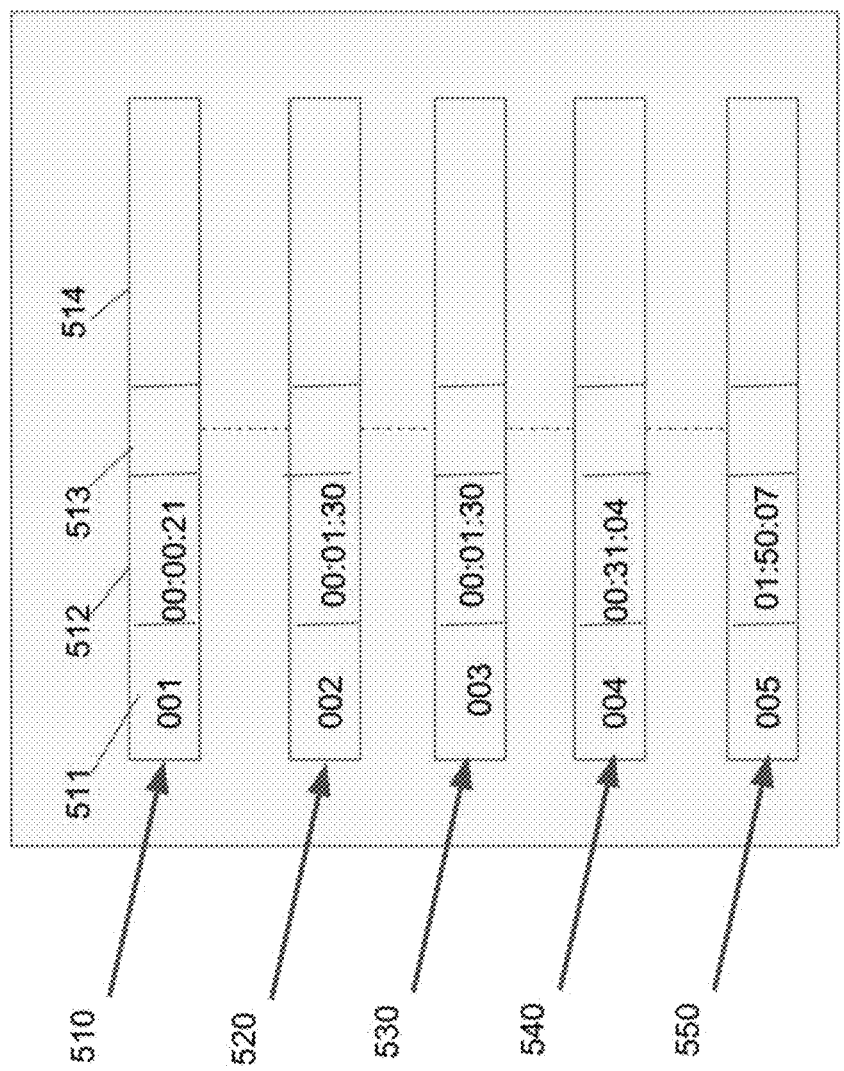
FIG. 5 illustrates a collection of submitted media content that has been synchronized to an existing media content in accordance with one or more embodiments.

FIG. 5 illustrates a collection of instances of submitted media content (510, 520, 530, 540, and 550) that have been synchronized to an existing media content in accordance with one or more embodiments. Each of the instances of submitted media content (510, 520, 530, 540, and 550) has been submitted by one or more creators, and each instance of submitted media content (510, 520, 530, 540, and 550) has been synchronized to a time within the existing media by one or more creators. Each creator can submit media content and synchronize the submitted media content to existing media content using interface 400 of FIG. 4, for example. Each of the instances of submitted media content (510, 520, 530, 540, and 550) can be eligible to be included within an arrangement of media content for a viewer that views the existing media content that the instances of submitted content (510, 520, 530, 540, and 550) are synchronized to.

The collection of instances of submitted media content that has been synchronized to an existing media content can be stored within a special-purpose data type and/or stored as metadata that is associated with the existing media content to which the submitted media content is synchronized to.

In the example of FIG. 5, instance of submitted media content 510 (and also the other instances) includes an index 510 that reflects an ordering number of submitted media content 510. For example, index 510 has an index value of "001," where the ordering of the submitted media content can be based on a time within the existing media content that the submitted media content is synchronized to. In the example of FIG. 5, instance of media content 510 has been synchronized to a time (i.e., 00:00:21) that is reflected in a time field 512. In the example of FIG. 5, instance of media content 510 has an index value of "001" because this instance of media content is synchronized to a time (i.e., 00:00:21) that precedes the other instances of media content.

Instance of submitted content 510 can also include a content location index 513 that identifies a location/repository from where the specific content can be retrieved. Each instance of submitted media content can also include play/display parameters. The play/display parameters 514 (of instance of submitted content 510) can also include settings that indicate how to affect the playing/displaying of the existing media when the submitted media is played. The play/display parameters can also indicate one or more tags/indications that have been assigned to the corresponding instance of submitted media content. For example, play/display parameters 514 can include tags/indications such as humor, commentary, popular, etc., depending on how submitted media instance 510 has been tagged. The play/display parameter can also include an above-described time flexibility for the corresponding instance of submitted media content. The time flexibility can be utilized when attempting to dynamically schedule the beginning times of two or more instances of media content when their corresponding durations overlap over each other. For example, if two instances of media content overlap over each other, then the arrangement can possibly include both instances of media content if at least one media content has the flexibility to be moved in front of or in back of the other instance of media content. The play/display parameter can also include analytics relating to the submitted media content including, for example, a number of likes for the submitted media content, a profitability rating, and/or a popularity rating for the submitted media content.

Figure 6:
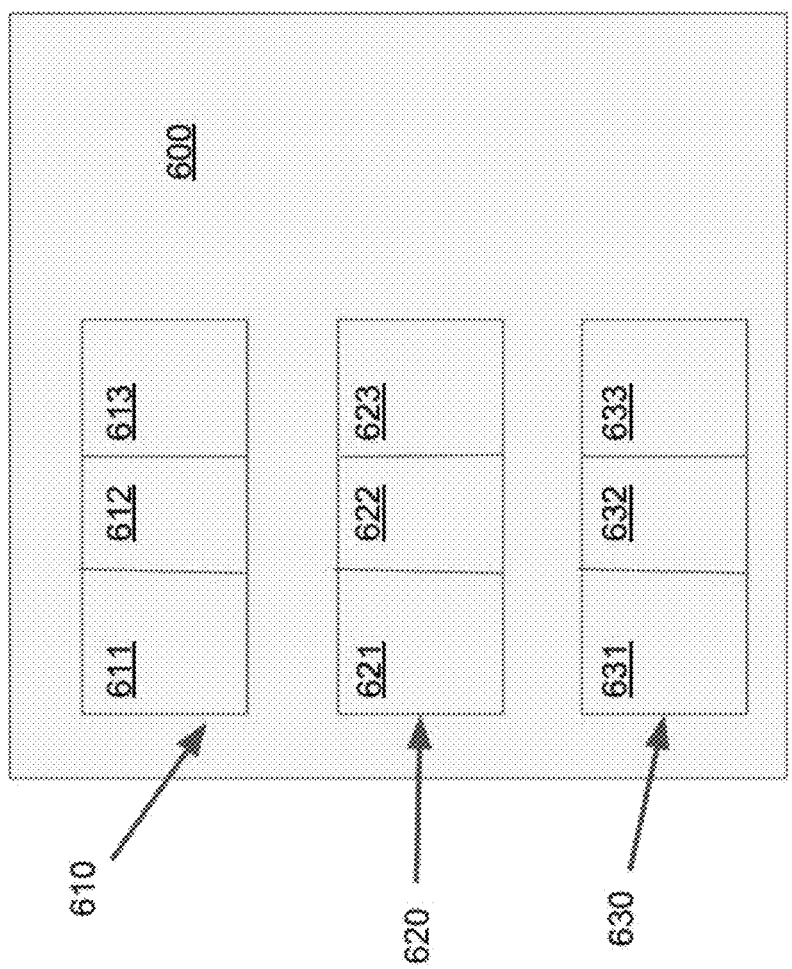
FIG. 6 illustrates an arrangement that is stored as a file in accordance with one or more embodiments.

FIG. 6 illustrates a stored arrangement of media content 600 in accordance with one or more embodiments. An arrangement can be stored as a special-purpose datatype, where each data type stores a plurality of instances of media content (610, 620, and 630) that is included within the respective arrangement 600. Arrangement 600 can include a field (not shown) that identifies the existing content that arrangement 600 is synchronized to. Each instance of media content can include an index, where each index identifies the particular content that corresponds to the instance of media content. For example, instance of media content 610 can include an index 611, where index 611 identifies the specific content. With one or more embodiments, index 611 can also identify a location/repository from where the specific content can be retrieved. In the example of FIG. 6, instance of media content 620 can include an index 621, and instance of media content 630 can include an index 631. Each instance of media content can also include play/display parameters, where these parameters can include a time within the corresponding existing content that the instance of media content is synchronized to. The play/display parameters can also include settings that indicate how to affect the playing/displaying of the existing media when the media of the arrangement is played. The play/display parameters can also indicate one or more tags/indications that have been assigned to the corresponding instance of media content. For example, play/display parameters 622 can include tags/indications such as humor, commentary, popular, etc., depending on how media instance 620 has been tagged. The play/display parameter can also include an above-described time flexibility for the corresponding instance of media content. The play/display parameter can also include analytics relating to the media content including, for example, a number of likes for the media content, a profitability rating, and/or a popularity rating for the media content. In the example of FIG. 6, instance of media content 610 includes play/display parameters 612. Instance of media content 620 includes play/display parameters 622, and instance of media content 630 includes play/display parameters 632. Each instance of media content can also include a link to a subsequent instance of media. For example, in the example of FIG. 6, each instance of media content (610, 620, and 630) can have a respective link (613, 623, and 633), which refers/links to a subsequent instance of media which occurs next when playing the existing content. In the example of FIG. 6, link 613 links to instance of media content 620, and link 623 links to instance of media 630, for example.

Although the arrangement of media (that is associated with an existing media) is dynamically changing in accordance with the inputs and preferences of a viewer, if the viewer wants to save a particular arrangement before the particular arrangement is changed, then one or more embodiments can allow the particular arrangement to be saved as a file. The file can be associated with the profile of the viewer, and thus the viewer can continually view or share particular arrangements that the viewer enjoyed.

With another embodiment, a portion of the arranged content and a portion of the existing content (to which the portion of the arranged content corresponds to) can be saved as a shareable data file. The data file can be configured to have a threshold size limit or playback duration limit in order to allow the sharing of the arranged content along with the existing content. Once the data file is saved, the portion of the arranged content and the portion of the existing content can be played together on social media platforms, other video platforms, etc.

Figure 7:
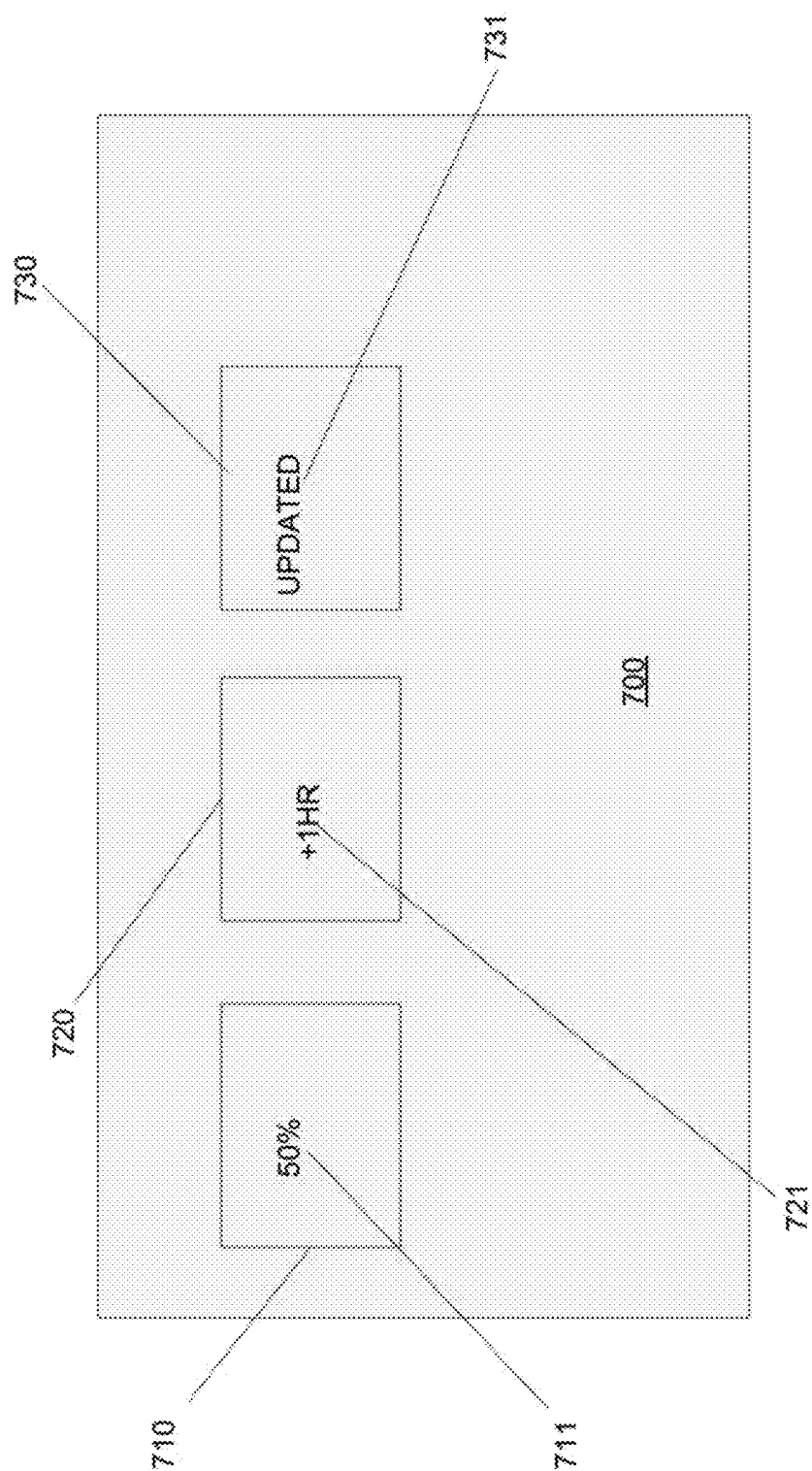
FIG. 7 illustrates an example user interface that indicates an arrangement, which is associated with an existing content, has changed since the last viewing of the arrangement.

FIG. 7 illustrates a user interface that indicates that an arrangement has changed since the last viewing of the arrangement. One or more embodiments can display a level/amount of change that has occurred in the arrangement since the viewer's last viewing. For example, one or more embodiments can display a percentage of change between the current arrangement since the last viewing by the viewer.

Therefore, with one or more embodiments, a viewer will be able to determine whether or not the user wants to view the arrangement again. With one or more embodiments, an indicator can be presented next to existing media that shows that the arrangement corresponding to the existing media has changed since the last viewing. With one or more embodiments, the indicator can also describe what types of changes have occurred.

In the example of FIG. 7, interface 700 can display three arrangements of media content (710, 720, and 730) that are each associated with and synchronized to an existing media content. As described above, each arrangement can have an indicator that is presented in conjunction with the associated existing media. An indicator 711 provides an indication that 50% of arrangement 710 has changed since the last viewing. An indicator 712 provides an indication that one hour of material has changed in arrangement 720 since the last viewing. Finally, an indicator 731 indicates that arrangement 730 has been updated since the last viewing. One or more different types of indicators can be used.

Figure 8:
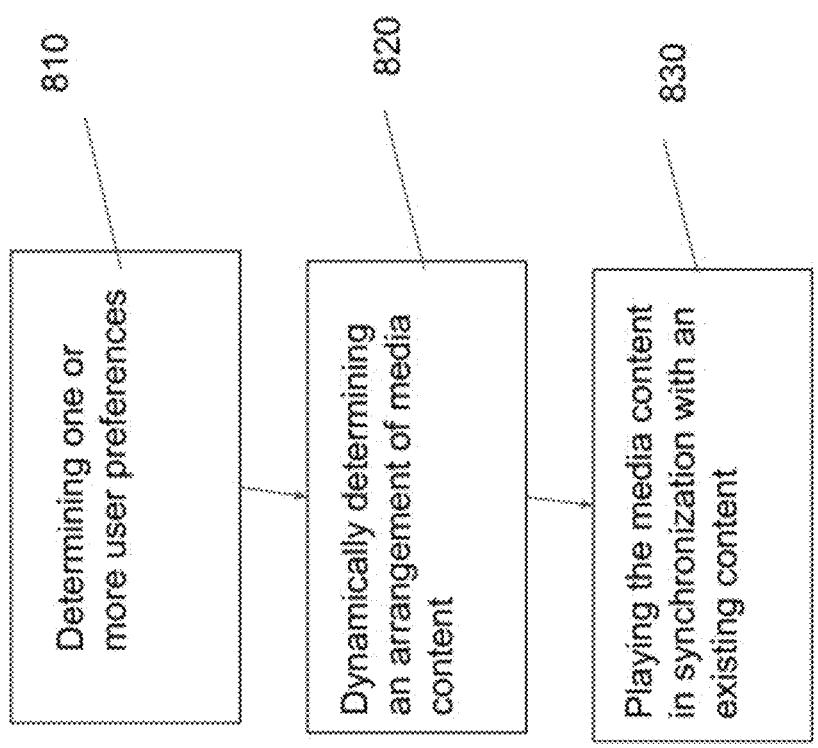
FIG. 8 depicts a flow diagram of a method for generating an arrangement of media content in accordance with one or more embodiments.

FIG. 8 depicts a flow diagram of a method for generating an arrangement of media content in accordance with one or more embodiments. The method depicted by the flow diagram can be performed by one or more components of a system, such as system 110, for example. The method, at 810, includes determining one or more user preferences. The method, at 820, includes dynamically determining an arrangement of media content. The arrangement includes a plurality of media content that is synchronized with an existing content. The media content within the arrangement is changeable based on the one or more user preferences. The method, at 830, includes playing the media content of the arrangement in synchronization with the existing content.

Figure 9:
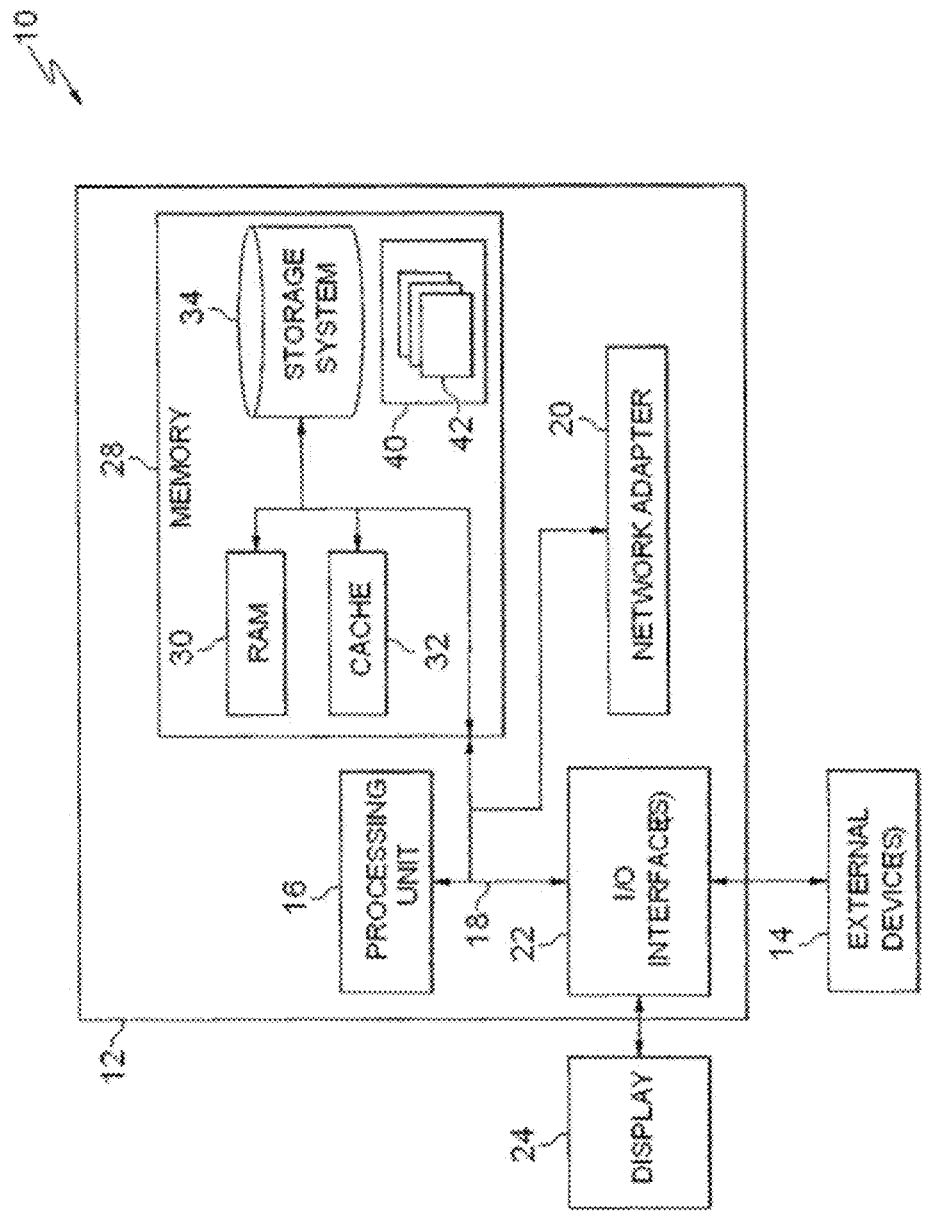
FIG. 9 illustrates a computer system in accordance with one or more embodiments.

FIG. 9 illustrates an apparatus 10 in accordance with one or more embodiments. In one embodiment, apparatus 10 can be a user device such as, for example, user device 118 of FIG. 1. In another embodiment, apparatus 10 can be an application server such as, for example, application server 116 of FIG. 1. As illustrated in FIG. 9, apparatus 10 includes a processor 16 for processing information and executing instructions or operations. Processor 16 may be any type of general or specific purpose processor. While a single processor 16 is shown in FIG. 9, multiple processors may be utilized according to other embodiments. In fact, processor 16 may include one or more of general-purpose computers, special purpose computers, microprocessors, digital signal processors (DSPs), field-programmable gate arrays (FP- GAs), application-specific integrated circuits (ASICs), and processors based on a multi-core processor architecture, as examples. Processor 16 can also communicate with one or more network adapters 20.

Apparatus 10 further includes a non-transitory computer readable medium (memory 28), which may be coupled to processor 16, for storing information and instructions that may be executed by processor 16. Memory 28 may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. For example, memory 28 can be comprised of any combination of random access memory (RAM), read only memory (ROM), static storage such as a magnetic or optical disk, or any other type of non-transitory machine or computer readable media. The instructions stored in memory 28 may include program instructions or computer program code that, when executed by processor 16, enable the apparatus 10 to perform tasks as described herein.

Apparatus 10 may also include one or more external devices 14 (such as an antenna, for example) for transmitting and receiving signals and/or data to and from apparatus 10. Apparatus 10 may further include a transceiver configured to transmit and receive information. For instance, transceiver may be configured to modulate information onto a carrier waveform for transmission by the antenna(s) and demodulates information received via the antenna(s) for further processing by other elements of apparatus 10. In other embodiments, the transceiver may be capable of transmitting and receiving signals or data directly.

Processor 16 may perform functions associated with the operation of apparatus 10 including, without limitation, precoding of antenna gain/phase parameters, encoding and decoding of individual bits forming a communication message, formatting of information, and overall control of the apparatus 10, including processes related to management of communication resources.

In an embodiment, memory 28 stores software modules 40 that provide functionality when executed by processor 16. The modules 40 may include, for example, an operating system 42 that provides operating system functionality for apparatus 10. The memory may also store one or more functional modules, such as an application or program, to provide additional functionality for apparatus 10. The components of apparatus 10 may be implemented in hardware, or as any suitable combination of hardware and software. Memory 28 can also include random access memory 30, a cache 32, and or any other storage system 34.

In one or more embodiments, apparatus 10 can include a graphics system that is configured to generate frames of video data and transmit the frames of video data to an input/output interface 22 and/or a display device 24.

Figure 10:
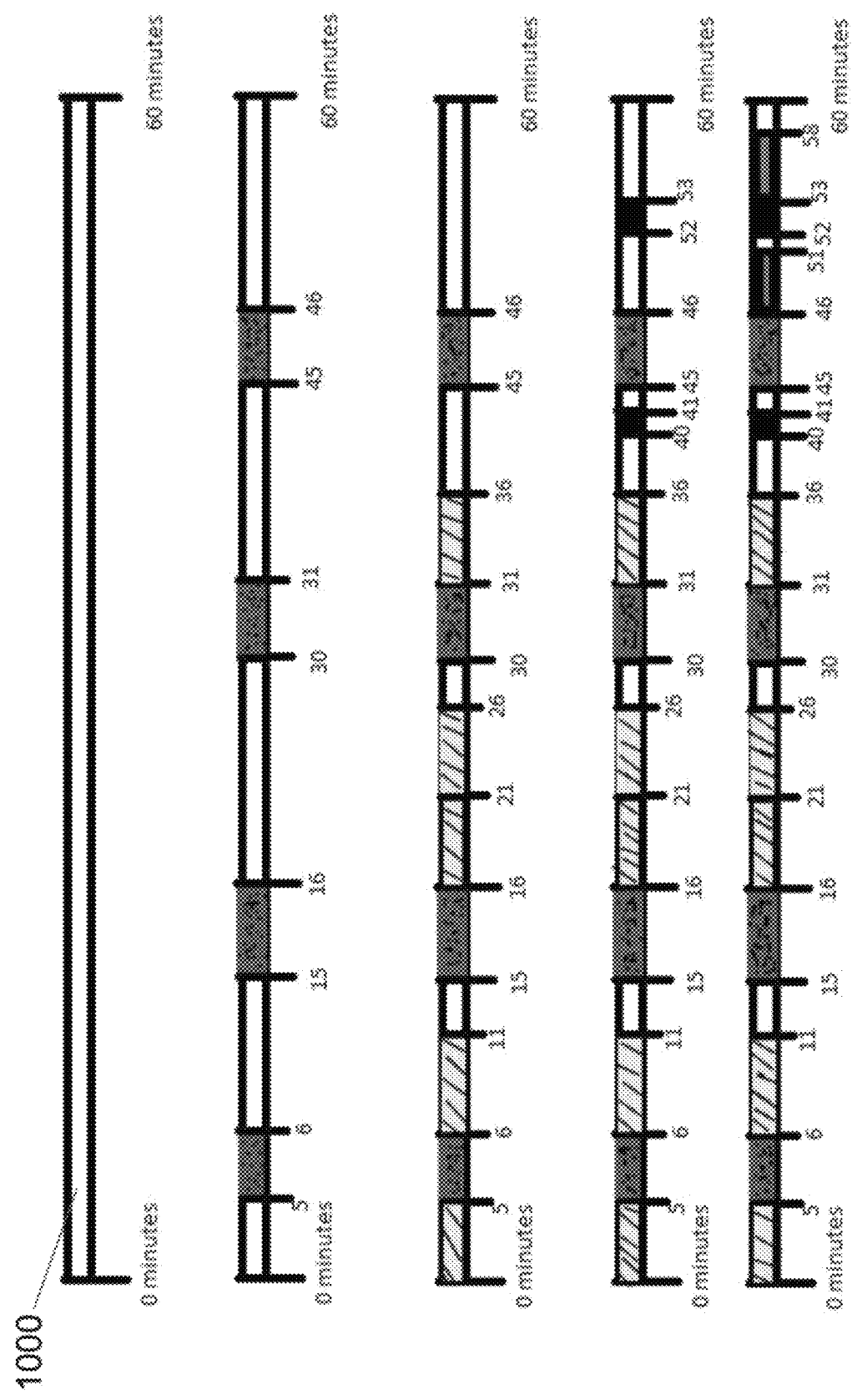
FIG. 10 illustrates an example method of dynamically arranging media content in accordance with one or more embodiments.

FIG. 10 illustrates arranging media content in accordance with one or more embodiments. As described in more detail below, one or more embodiments can dynamically arrange media content in accordance with a combined set of specific rules that allows a user/viewer to see synchronized content that the user is likely to be interested in. One or more embodiments of the present invention include a system where a user can log in and save the user's preferences. The user's preferences will include a record of creators that the user is "subscribed to" for content, and also a record of which videos a subscriber has "liked" and "disliked," for example.

As described above, one or more embodiments can overlay the arrangement of media content over the existing media content, when playing the arrangement of media content. The content (of the arrangement of media content) that is displayed in conjunction with the existing content can be displayed over the existing content, in accordance with one or more embodiments. If the arrangement of media content is displayed over the existing content, then the arrangement of media content can be referred to as "overlay content." For example, video content that is overlaid over the existing content can be referred to as an "overlay video." Although the present example describes overlay content, the content of the arrangement of media content need not be displayed as overlay content.

One or more embodiments can implement at least two types of overlay content. A first type of overlay content can be overlay content that is synchronized by the creator to a specific time. In the example of FIG. 10, suppose that a second type of media (overlay) content has a time flexibility that allows the second type of media content to be positioned at any time within the timeline of the existing media content. As such, the second type of overlay content is overlay content that is associated to a specific existing media content, but the creator has not synchronized this second type of overlay content to a specific time.

When displaying the overlay content to a viewer, the overlay content that is shown to the viewer can be based on the viewer's preferences. As a first priority, one or more embodiments can display the overlay content that is created by creators to which the viewer is subscribed to.

Referring to the example of FIG. 10, instances of overlay content of the first type (synchronized) which the viewer has subscribed to occur at the 5 minute mark, the 15 minute mark, the 30 minute mark, and the 45 minute mark (indicated with a dotted pattern). Next, one or more embodiments then include the overlay content of the second type (unsynchronized) which the viewer has subscribed to (which are indicated in dashed lines). One or more embodiment arrange this content in chronological order starting from the beginning.

In the example shown in FIG. 10, instances of overlay content of the second type (unsynchronized) which the viewer has subscribed to occur at the 0 minute mark, 6 minute mark, 16 minute mark, 21 minute mark, and 31 minute mark (indicated with a pattern with dash lines). One or more embodiments can avoid arranging a 5-minute unsynchronized subscribed overlay content at the 11 minute mark, because there is only a 4 minute span between the 11 minute mark and the 15 mark. This 4 minute span is not large enough to accommodate a 5-minute unsynchronized subscribed content.

As a subsequent priority, one or more embodiments can include the content that have received "likes" by different users, where such content is included within the arrangement, where the content that has the most likes is prioritized over content that has fewer likes. If one or more instances of content have an equal number of likes, then the most-recently uploaded content can receive priority, for example.

One or more embodiments can then arrange the 1-minute synchronized liked content (which are indicated in black). In the example shown in FIG. 10, 1-minute synchronized liked content occur at the 40 minute mark and the 52 minute mark.

One or more embodiments can then include the overlay content that corresponds to 5-minute unsynchronized liked content (which are indicated in gray). One or more embodiments can arrange this content in chronological order starting from the beginning.

In view of the above, with one or more embodiments of the present invention, if an instance of overlaid content is still playing when another instance of content is scheduled to be played, whichever content has higher priority can be played. For example, an overlay content that is created by a creator to which the viewer is subscribed to can have higher priority than an overlay content with a lot of "likes." In this example, the overlay content that has higher priority occupies the timeline and is played, while any lower priority overlay content that conflicts in time with the higher priority overlay content is not played.

Figure 11:
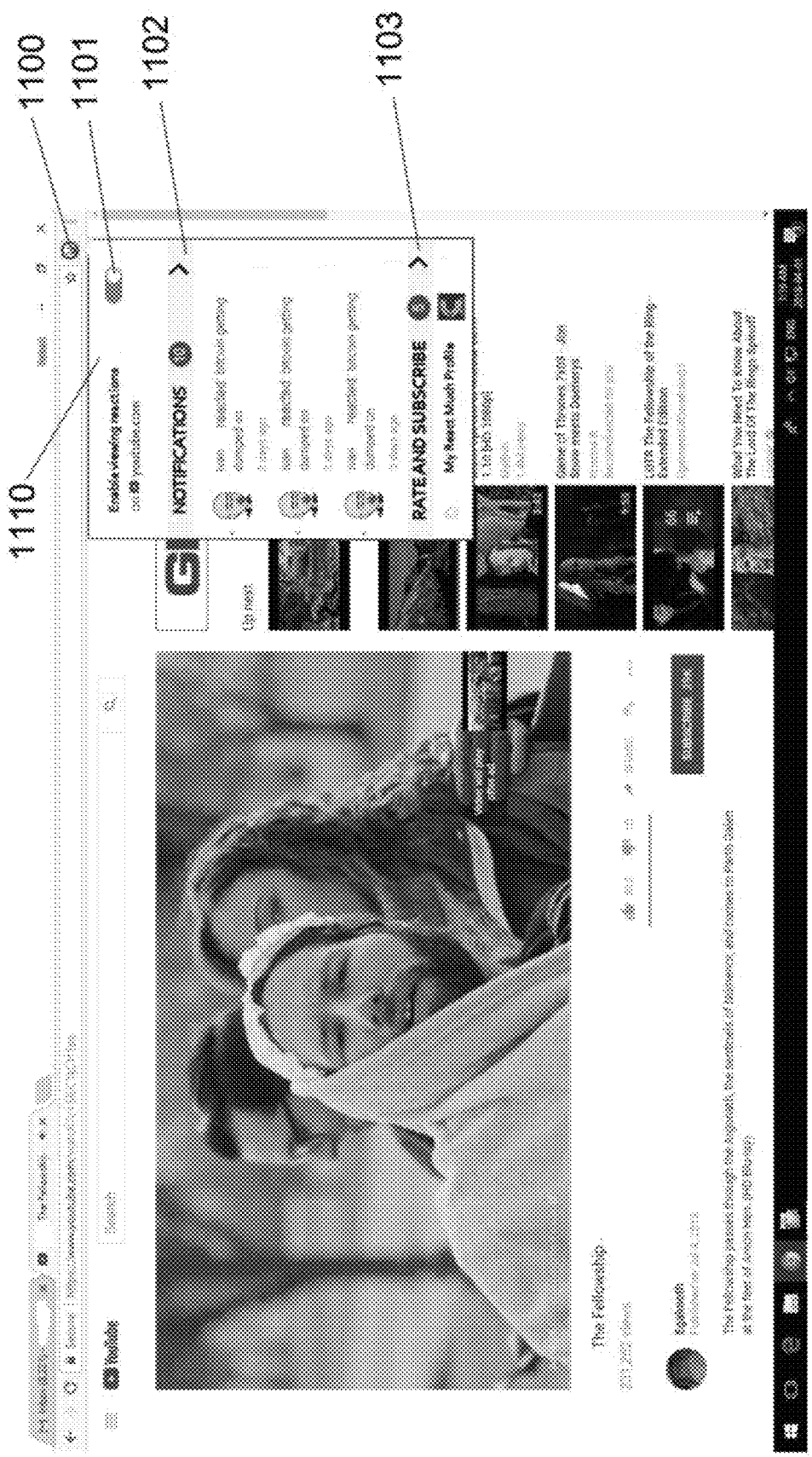
FIG. 11 illustrates an example interface of a plug-in in accordance with one or more embodiments.

FIG. 11 illustrates an example interface 1110 of a plug-in 1100 in accordance with one or more embodiments. With one or more embodiments, suppose a viewer begins playing an existing media content. Further, suppose that the viewer has not yet enabled any generated arrangement of media content to be played in synchronization with the existing content. If the present existing media content has any media content synchronized therewith (i.e., if the present existing media has any overlay media associated therewith, for example), then the viewer can be notified (via an indication) of the synchronized/overlay media by one or more embodiments of the present invention. For example, the icon of the plug-in 1100 can provide the indication, or a message can appear that provides the indication. Once the viewer is notified of the existence of synchronized/overlay media with the viewed existing media content, one or more embodiments can allow the viewer to enable playing of the generated arrangement of media content in synchronization with the existing media.

For example, one or more embodiments of the present invention can implement a plug-in within the viewer's browser. Once the viewer navigates to an existing media content that includes media content synchronized therewith (but where the playing of such synchronized media content is disabled at the present time), the plug-in can provide a notification message/window to the viewer. The viewer can then enable playing of the generated arrangement of media content via a selectable option indicator 1101.

Referring to FIG. 11, if the viewer accesses/clicks on the plug-in 1100, then a window 1110 can provide the viewer with different options/information. For example, the window can provide a notification 1102 to the viewer that a creator (to which the viewer has subscribed to) has uploaded/created media content that is synchronized to an existing media content. For example, the window can notify that a creator has provided a "reaction" video to an existing media content. The viewer can thus know where to find content that is created by the subscribed-to creator. The existing content (that the subscribed-to creator has synchronized created media content to) may or may not correspond to the existing content that is currently being viewed by the viewer.

Further, the window can provide another notification 1103 that allows the viewer to rate the instances of media content (that are synchronized to existing media content) that the viewer has previously viewed. By collecting the ratings that are provided by the viewer, one or more embodiments can determine the viewer's preferences. One or more embodiments can also allow the viewer to access a viewer profile, as described in more detail below.

Figure 12:
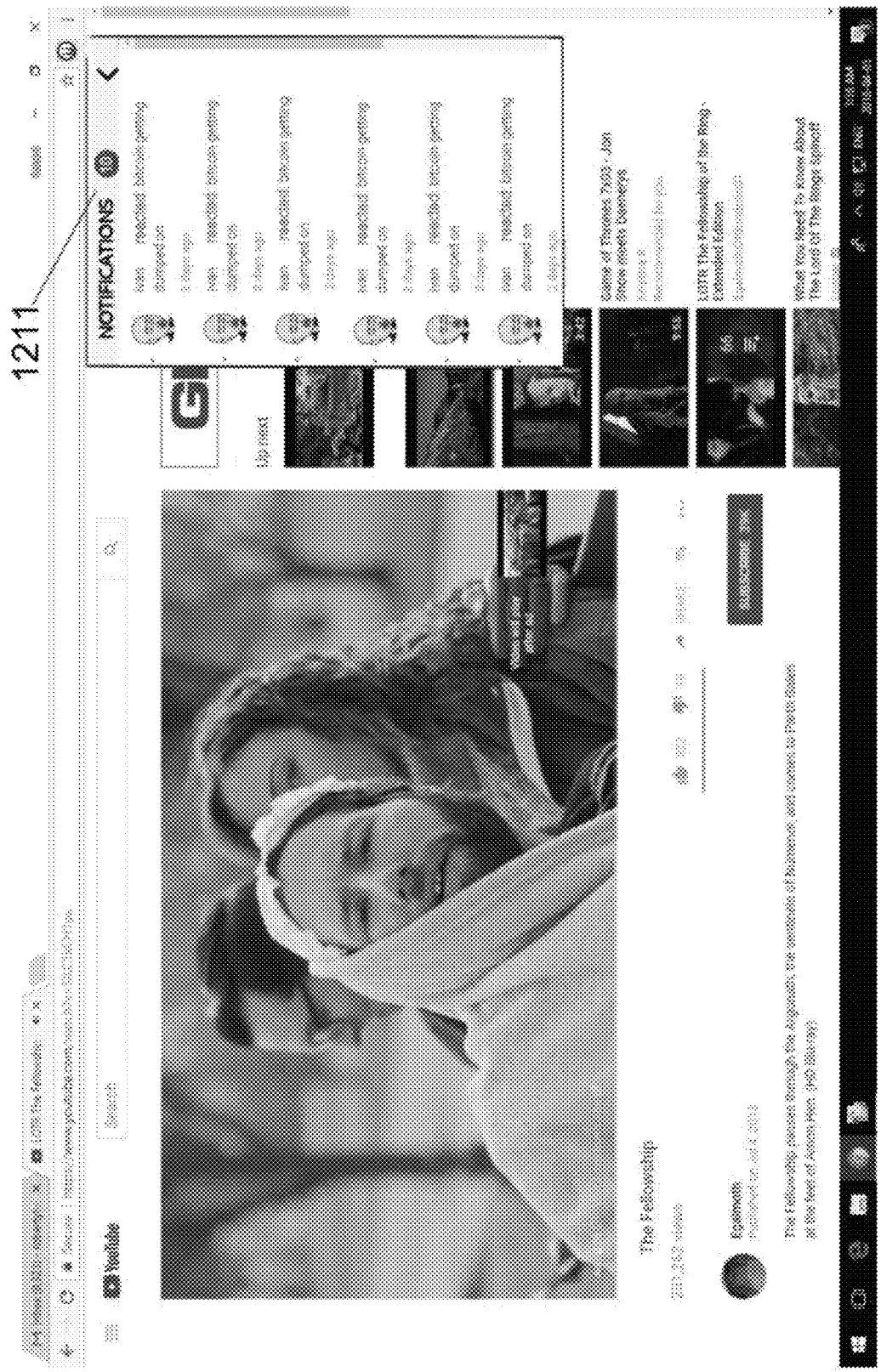
FIG. 12 illustrates another example interface of the plug-in in accordance with one or more embodiments.

FIG. 12 illustrates another example interface of the plug-in in accordance with one or more embodiments. Referring to FIG. 12, if the viewer clicks/accesses a link in order to access more information about uploaded content by creators (to which the viewer has subscribed to), then a window/interface 1211 displays the specific instances of uploaded content, as well as when the content was uploaded. The interface 1211 can also display the existing media content that each instance of uploaded content is synchronized to.

Figure 13:
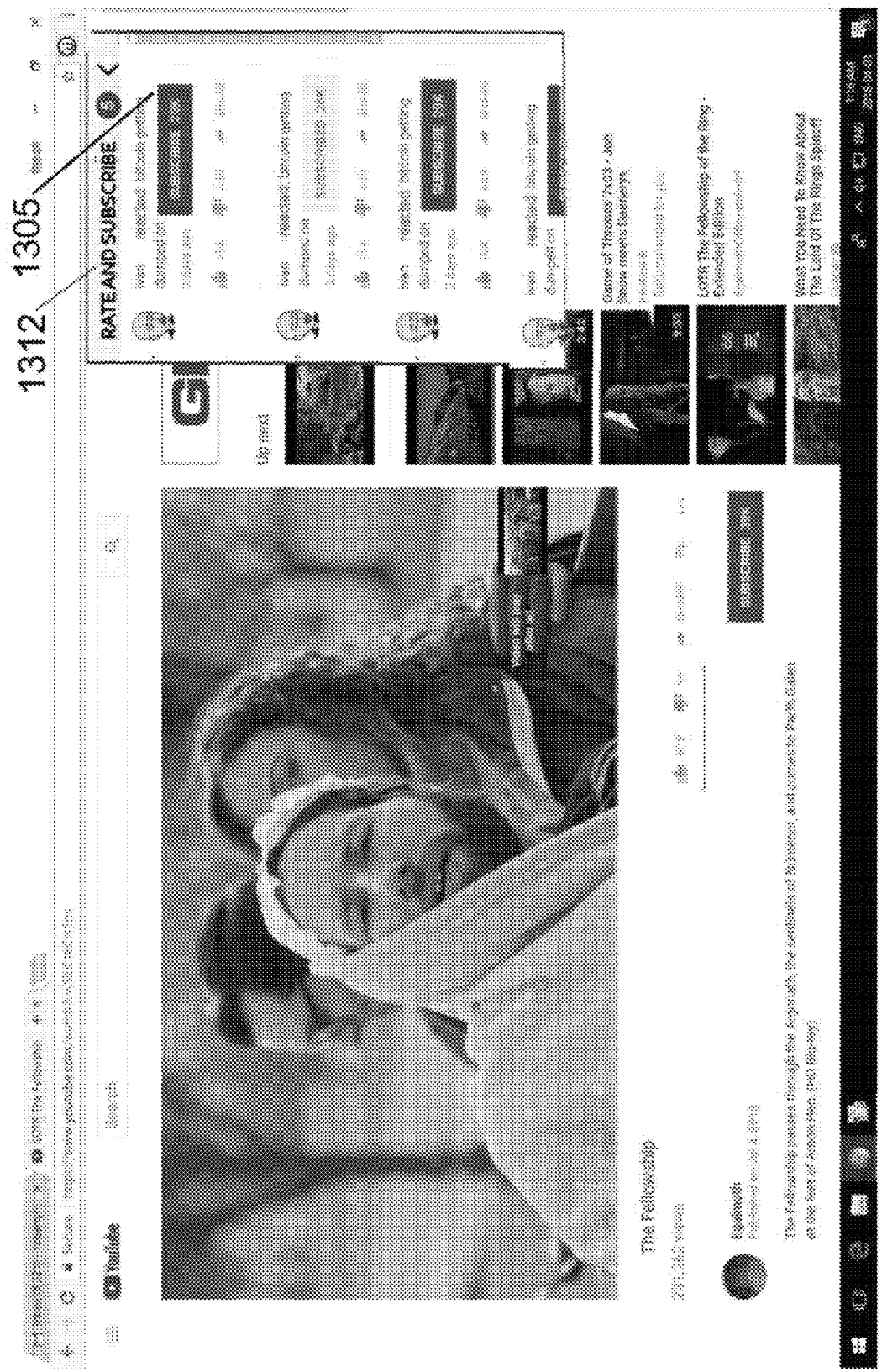
FIG. 13 illustrates another example interface of the plug-in in accordance with one or more embodiments.

FIG. 13 illustrates another example interface 1312 of the plug-in in accordance with one or more embodiments. Referring to FIG. 13, if the viewer clicks/accesses a link in order to rate the instances of media content that the viewer has previously viewed, then a window/interface can display the specific instances of media content that are to be rated by the viewer. The viewer can provide a "like" or a "dislike" for each instance of synchronized media content that the viewer has previously viewed. The window/interface can also allow the viewer to share the instance of media content, and the window/interface can also allow the viewer to subscribe (via a subscribe button 1305) to the corresponding creator if the viewer has not yet done so.

Figure 14:
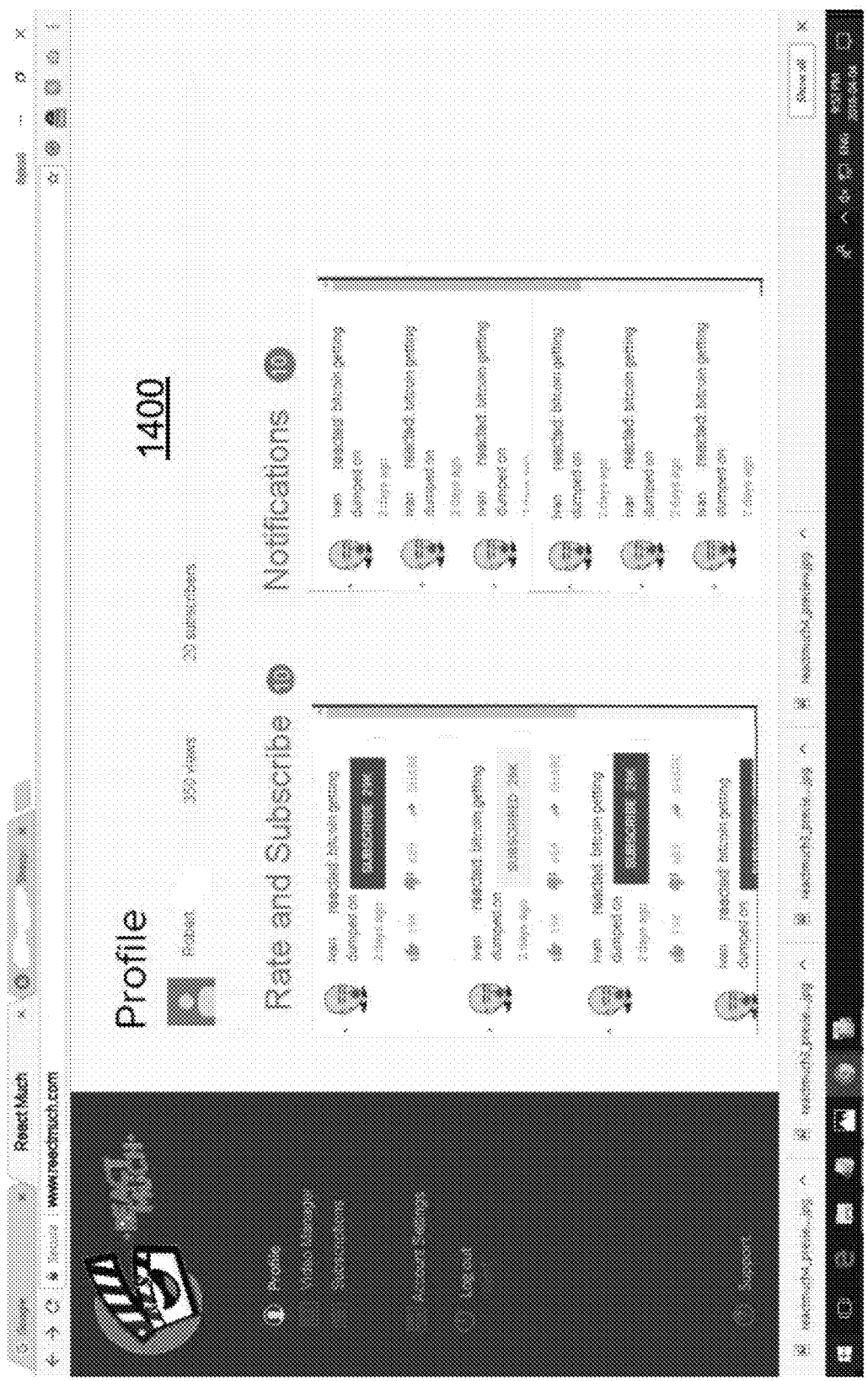
FIG. 14 illustrates a generated profile interface in accordance with one or more embodiments of the present invention.

FIG. 14 illustrates a generated profile interface 1400 in accordance with one or more embodiments of the present invention. With one or more embodiments of the present invention, the generated interface 1400 can include a profile page. The profile page 1400 can display a listing of instances of arranged media that the viewer has previously watched. As described above, the generated interface can provide the viewer with the option to subscribe to the creators who created the previously-watched instances of arranged media. For instance, the viewer can click on a "subscribe" box to subscribe to a particular creator.

Further, the profile page can also provide the viewer with notifications of arranged media that have been created by different creators. With one or more embodiments, the profile page can notify the viewer of media that has been created by creators to which the viewer is subscribed to. As such, the viewer can view the most recently arranged media. In other words, the viewer can be notified that one or more creators have created an instance of media content and have associated the created media content to an existing content. The profile page can be accessed via a profile icon of the generated interface.

The profile page can also indicate the number of other creators that the user has subscribed to. The profile page can also provide a listing of the other creators that the user has subscribed to. As discussed above, the user can both be a viewer of arranged content (that is associated with existing content) and also a creator of arranged content (that is associated with existing content). The profile page can also indicate a number of views that the user has accrued via the user's own created arranged content (that has been associated with existing content).

Figure 15:
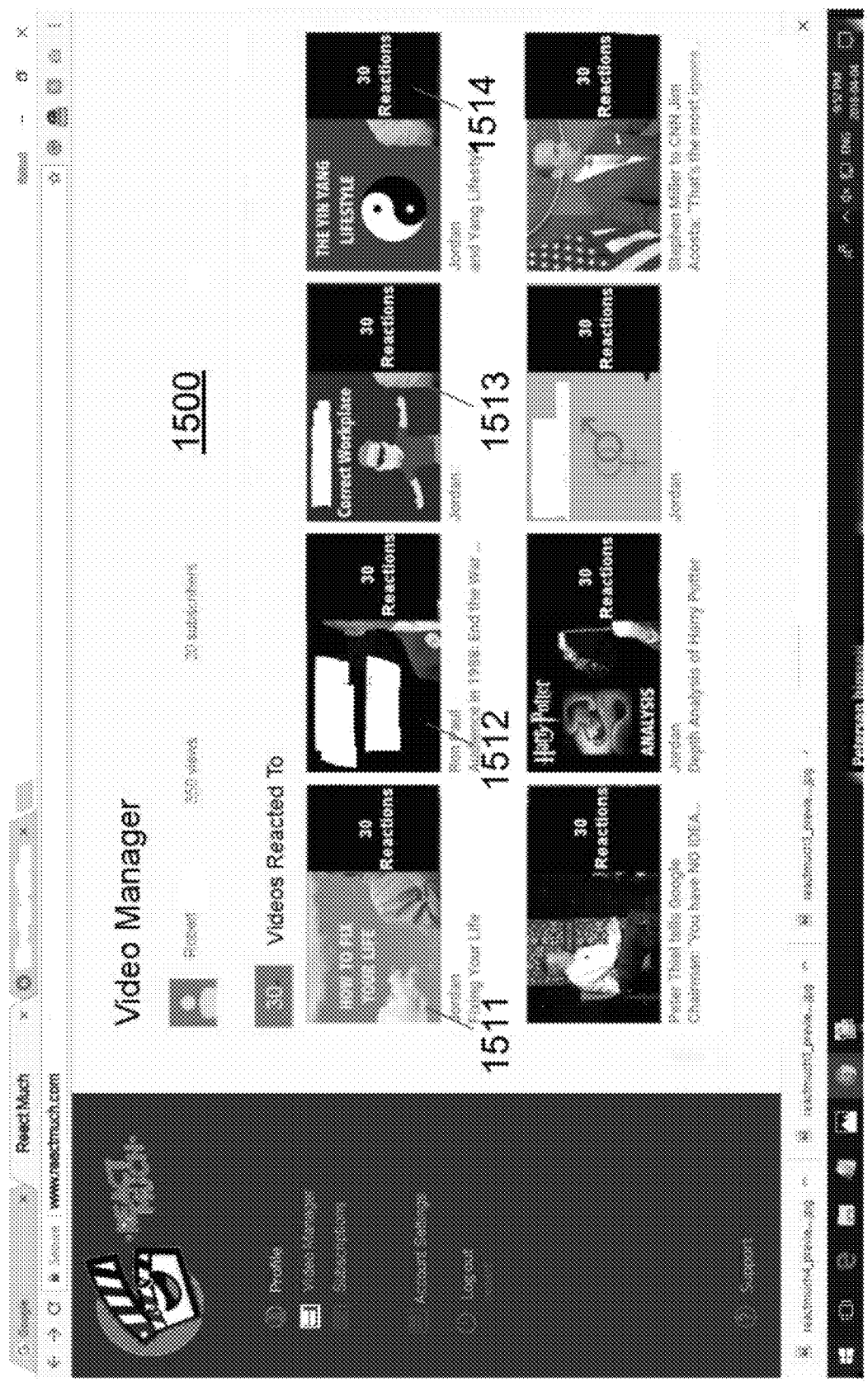
FIG. 15 illustrates a video manager interface in accordance with one or more embodiments of the present invention.

FIG. 15 illustrates a video manager interface 1500 in accordance with one or more embodiments of the present invention. As described above, a user of the generated interface 1500 can be both: (1) a viewer of arranged media content, and (2) a creator of arranged media content. For example, the user can create media content and synchronize/associate the created media to existing content.

Referring to FIG. 15, the "Video Manager" page 1500 can indicate to the user which existing content that the user has associated/synchronized created media content to. In other words, the Video manager can display a library of existing content that the user has created media content for. In the example of FIG. 15, the user has associated/synchronized created media content to 30 instances of existing content including, for example, 1511, 1512, 1513, 1514, etc. The video manager can also indicate how many instances of created media content are synchronized to each instance of existing media.

Figure 16:
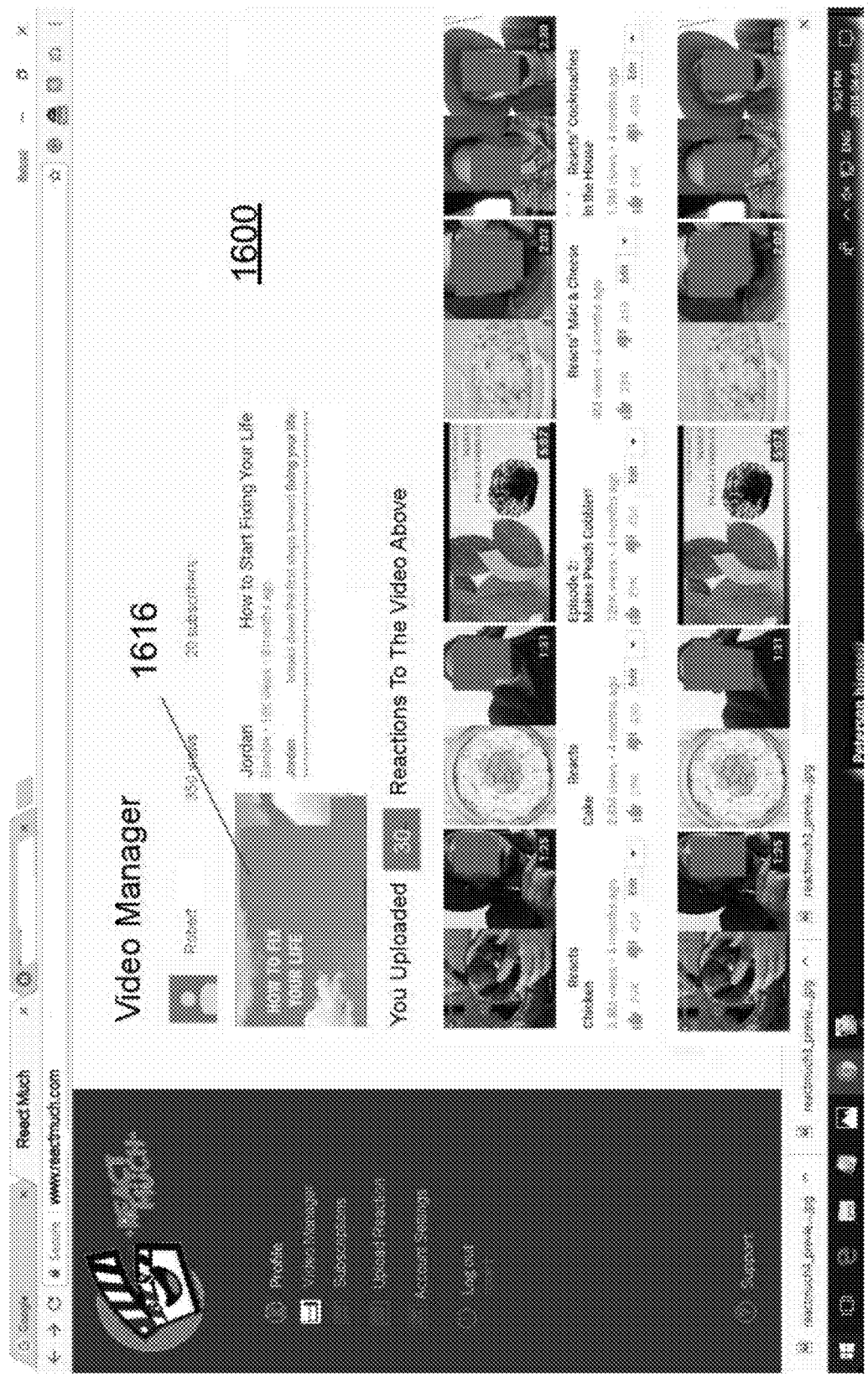
FIG. 16 illustrates another video manager interface in accordance with one or more embodiments of the present invention.

FIG. 16 illustrates a generated interface 1600 that allows a user/creator to associate/synchronize created media content to existing content, in accordance with one or more embodiments of the present invention. In the example of FIG. 16, the "Video Manager" page 1600 provides an indication that 30 instances of created media content have been synchronized to existing content 1616. Specifically, the user/creator has created 30 "reaction videos" to existing content 1616.

Figure 17:
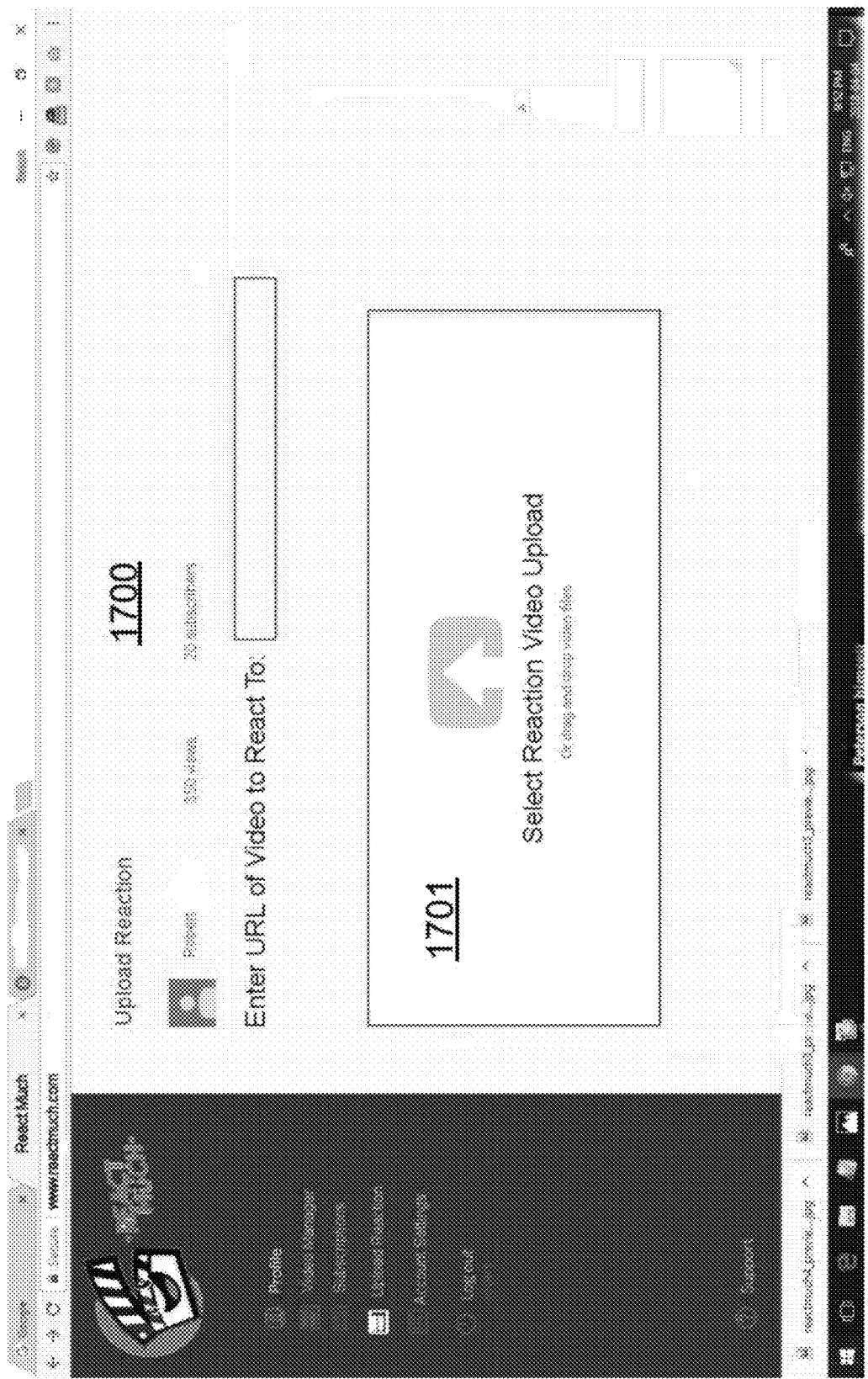
FIG. 17 illustrates an interface that allows a user/creator to select media to associate/synchronize to an existing content.

FIG. 17 illustrates an interface 1700 that allows a user/creator to select media to associate/synchronize to an existing content. With one or more embodiments of the present invention, the generated interface 1700 can allow a user/creator to associate/synchronize created media content to an instance of existing content. Within the interface 1700 of FIG. 17, the user/creator can provide input 1701 to indicate an instance of existing content to synchronize created media content to. For example, the user/creator can indicate the instance of existing content by indicating a location address (such as a by indicating a Uniform Resource Locator "URL") of the existing content.

With one or more embodiments of the present invention, the user can indicate the existing content (to which the user wants to synchronize content to) by browsing to the existing content. In other words, the user can indicate that the user wishes to associate content to the existing content that the user is currently viewing. For example, via a plugin functionality, the user can indicate to the system of one or more embodiments that the user desires to synchronize/associate content to the existing content that the user is currently viewing.

In the example of FIG. 17, the user/creator indicates a URL of a video that the user/creator has reacted to, and thus the user/creator is able to synchronize created media content to this instance of existing content. The user can indicate the instance of created media content by uploading the instance of created media content, for example.

Figure 18:
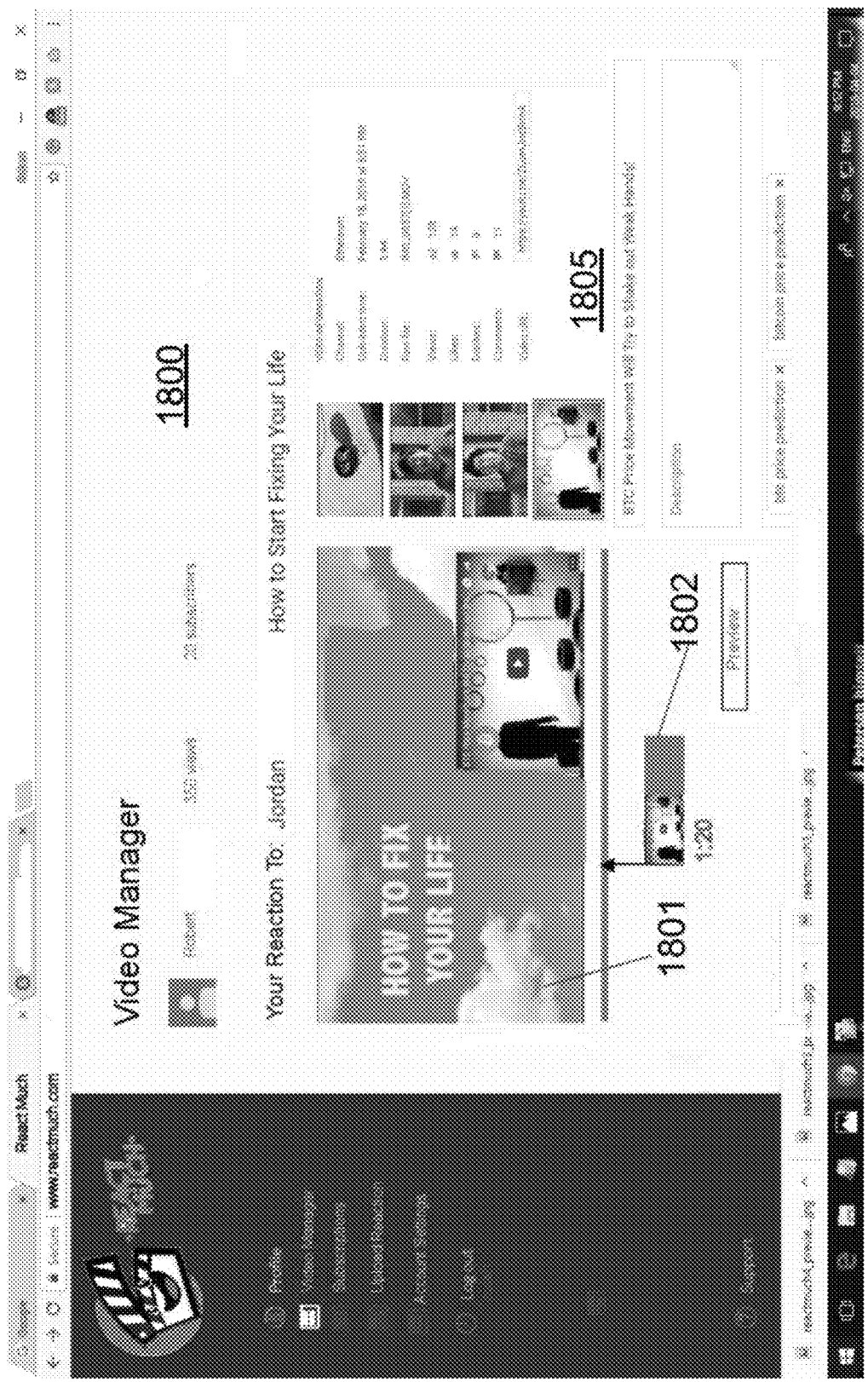
FIG. 18 illustrates an interface that allows a user/creator to synchronize/associate selected media content to existing content in accordance with one or more embodiments of the present invention.

FIG. 18 illustrates an interface 1800 that allows a user/creator to synchronize/associate created media content 1802 to existing content 1801, in accordance with one or more embodiments of the present invention. With one or more embodiments, after a user/creator designates an instance of existing content 1801 to synchronize/associate created media content 1802 to, and after the user also designates an instance of created media content to synchronize to the instance of existing content, the user/creator can position the created media content within the timeline of the existing content.

In the example of FIG. 18, the user/creator can use a slider to drag and slide a representation of the created media content 1802 within the timeline of the existing content 1801. The timeline of the existing content can reflect the duration of the existing content, and the representation of the created media content can represent the duration of the created media content. The user/creator can use the slider to position the beginning of the created media content at a particular point in time within the timeline of the existing media content. In the example of FIG. 18, the user/creator has positioned the beginning of the created media content at the 1:20 mark of the existing content. Therefore, when the existing content is played by a viewer, the viewer can begin to play the synchronized created media content when the existing media content is played at the 1:20 mark.

As described above, the user/creator can also indicate a time flexibility for the created media content 1802. For example, the user/creator can indicate that the created media content 1802 can be positioned at any open time within the arrangement, where there is no other created media content synchronized to the existing media content at such open time. The user creator can also indicate that the created media content 1802 can be positioned a threshold amount of time before and/or after the time mark that the user has designated in FIG. 18 (e.g., where the time mark is 1:20).

Thus the time flexibility can be utilized when attempting to dynamically schedule the beginning times of two or more instances of media content when their corresponding durations overlap over each other. For example, if two instances of media content overlap over each other, then the arrangement can possibly include both instances of media content if at least one media content has the flexibility to be moved in front of or in back of the other instance of media content.

With one or more embodiments, the user can preview how the existing content is synchronized with the created media content by clicking/accessing a "preview" button. As such, one or more embodiments can show the user how the create media content will be displayed in conjunction with the existing content. As such, one or more embodiments can show the portions of the existing media that will continue to play while the created media content is displayed, in the case that user decides that the existing content should continue to play. Further, one or more embodiment can show how the voice ducking or volume controls would work. Further, one or more embodiments can show the point of the existing media that the existing media will be paused at, while the created media content is displayed, in the case that the user decides that the existing content should be paused. When the user/creator is satisfied with how the created media content is synchronized with the existing content, the user/creator can save the synchronization between the two instances of content. Thus, the preview can display the existing content in association with the synchronized created media content. Once the user is satisfied with how the created media content is synchronized with the existing content, the user can save the association/synchronization.

Figure 19:
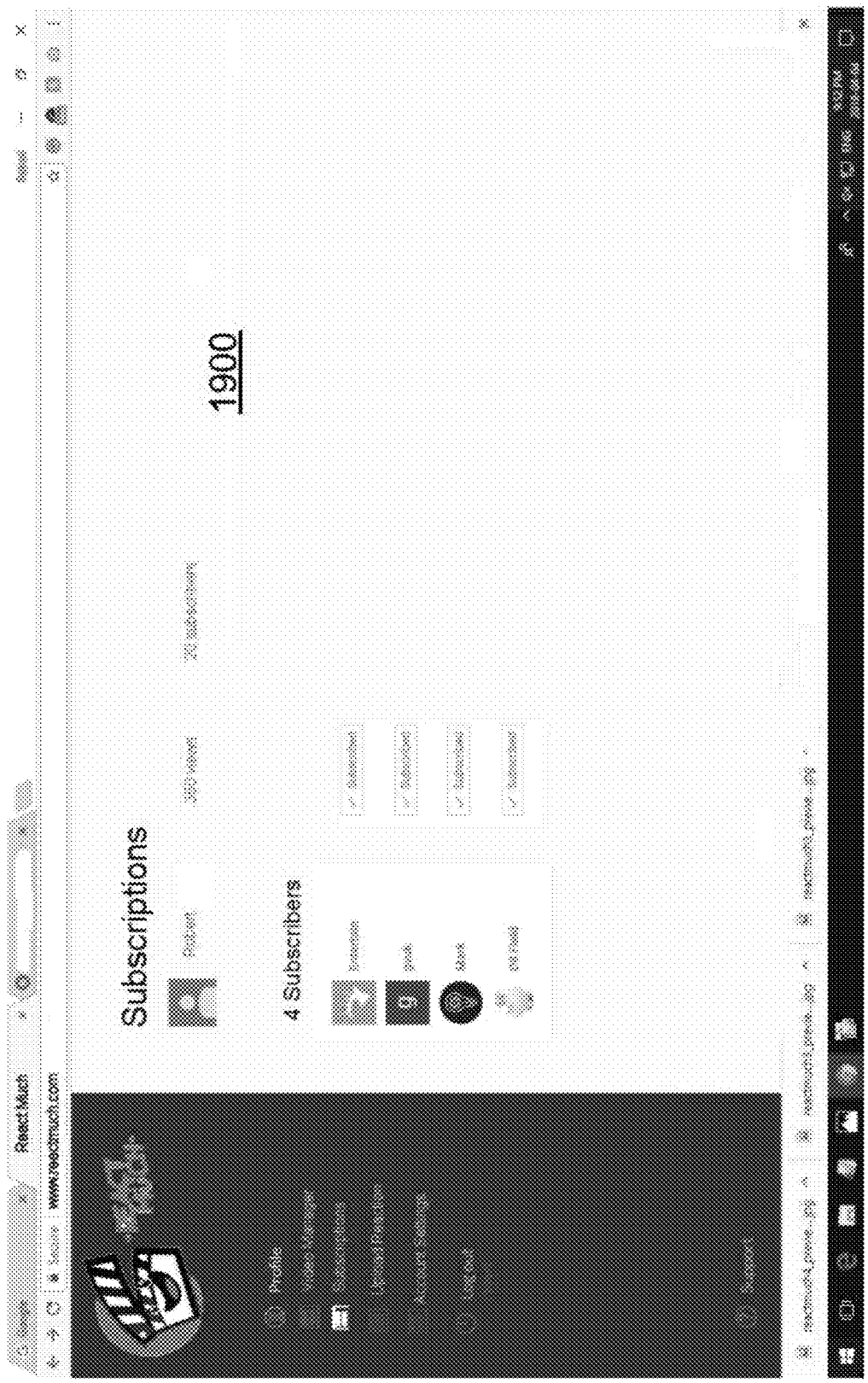
FIG. 19 illustrates an example interface that displays creators that a user has subscribed to in accordance with one or more embodiments of the present invention.

FIG. 19 illustrates an example interface 1900 that displays creators that a user has subscribed to, in accordance with one or more embodiments of the present invention. With one or more embodiments, an interface can display the creators that the user has subscribed to. In the example interface of FIG. 19, the user has subscribed to four different creators. Thus, with one or more embodiments, the user can receive notifications when these creators upload content that is synchronized to existing media.

The interface can also provide the user with recommended creators that the user can subscribe to based on the current list of creators that the user is subscribed to. For instance, if a user has subscribed to a particular creator, the system can recommend other suggested creators that the user may also desire to subscribe to, based on the subscribing behavior of other users who have subscribed to both the particular creator and to the suggested creators.

Figure 20:
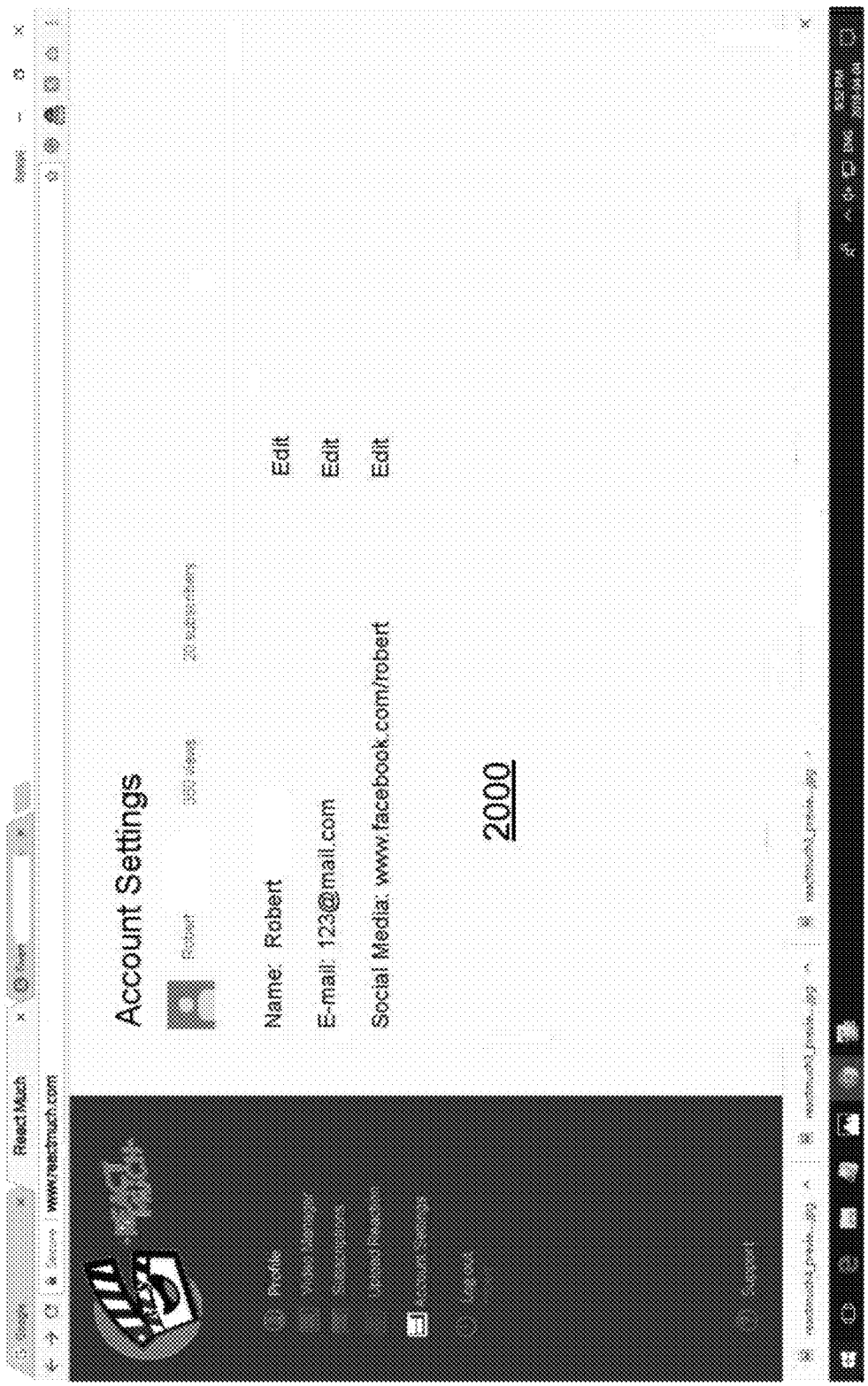
FIG. 20 illustrates an example interface that displays account settings.

FIG. 20 illustrates an example interface 2000 that displays account settings. With one or more embodiments, the generated interface 2000 can display the account settings of the user. For example, the account settings can include a name, an email, and/or a social media account, for example.

With one or more embodiments, the generated interface can allow a user to share the user's created content (that is synchronized to existing media) with the user's social network. In other words, the generated interface can allow to a user to display the existing media content and the synchronized media content in association with each other. When sharing the user's created content, the existing media content will also be played. The duration of existing media content that is played will be based on the duration of the shared created content (where the created content is synchronized with the created content). As such, a viewer will be able to see the shared created content and the existing content displayed/played in synchronization with each other. One or more embodiments can play the existing content for a short period of time before the created content begins, in order to provide some context for the viewer of what the viewer is seeing.

One or more embodiments are directed to a non-transitory machine-readable medium including one or more sequences of instructions which when executed by one or more processors cause the one or more processors to perform a method including receiving and storing in a memory an existing media content. The method also includes receiving and storing a first created media content. The first created media content is synchronized with the existing media content by being associated with a first time within the existing media content, and the first created media content is playable for a first duration of time. The method also includes receiving and storing a second created media content, wherein the second created media content is synchronized with the existing media content by being associated with a second time within the existing media content, and the second created media content is playable for a second duration of time. The first duration of time after the first time overlaps with the second duration of time after the second time. The method also includes dynamically generating an arrangement of media content at a time when the existing media is selected to be played. The generating dynamically includes selecting a selected content between the first created media content and the second created media content, and the selected content is associated with a third duration of time within the existing media content. The method also includes playing the arrangement of media content. The playing includes playing the existing media content and playing the selected content when the third duration of time is reached when playing the existing media content.

With one or more embodiments, the selecting the selected content is based on preferences of a user that selects the existing media to be played. With one or more embodiments, the existing media content corresponds to video content. With one or more embodiments, the method also includes transmitting an indication to a user that initiates playing of the existing content, after the user initiates playing of the existing content, that the selected content has been associated with the existing content. With one or more embodiments, the selected content includes created media content that is created by a creator to which the user is subscribed to. With one or more embodiments, the selecting the selected content is based on input provided by other users regarding the first created media content and input provided by other users regarding the second created media content. With one or more embodiments, the generating the arrangement of media content comprises including the selected content within the arrangement of media content and not including the non-selected content within the arrangement.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

What is claimed is:

1. A non-transitory machine-readable medium comprising one or more sequences of instructions which when executed by one or more processors cause the one or more processors to perform:

receiving and storing in a memory an existing media content;

receiving and storing a first created media content, wherein the first created media content is synchronized with the existing media content by being associated with a first time within the existing media content, and the first created media content is playable for a first duration of time;

receiving and storing a second created media content, wherein the second created media content is synchronized with the existing media content by being associated with a second time within the existing media content, the second created media content is associated with an indicated time flexibility, the indicated time flexibility indicating an amount of time that the second created media content can be moved from the second time when arranging the second created media content relative to the existing media content, and the second created media content is playable for a second duration of time, wherein the first duration of time after the first time overlaps with the second duration of time after the second time, and the overlap results in a conflict between the first created media content and the second created media content;

dynamically generating an arrangement of media content at a time when the existing media is selected to be played, wherein the generating dynamically comprises selecting the first created media content as a selected content between the first created media content and the second created media content, the selected first created media content is prioritized over the unselected second created media content, and the selected content is associated with a third time within the existing media content, and the unselected content is associated with a fourth time within the existing media content, and the unselected content is arranged relative to the selected content such that the unselected content is outside of the duration of the selected content, and such that the difference between the second time and the fourth time is based on the indicated time flexibility, in order to resolve the conflict; and playing the arrangement of media content, wherein the playing comprises playing the existing media content and playing the selected content when the third time within the existing media content is reached when playing the existing media content, and the playing comprises playing the unselected content when the fourth time within the existing media content is reached.

2. The non-transitory machine-readable medium of claim 1, wherein the selecting the selected content is based on preferences of a user that selects the existing media to be played.

3. The non-transitory machine-readable medium of claim 1, wherein the existing media content corresponds to video content.

4. The non-transitory machine-readable medium of claim 1, further comprising:

transmitting an indication to a user that initiates playing of the existing content, after the user initiates playing of the existing content, that the selected content has been associated with the existing content.

5. The non-transitory machine-readable medium of claim 4, wherein the selected content comprises created media content that is created by a creator to which the user is subscribed to.

6. The non-transitory machine-readable medium of claim 1, wherein the selecting the selected content is based on input provided by other users regarding the first created media content and input provided by other users regarding the second created media content.

7. An apparatus, comprising:
at least one processor; and
at least one memory including computer program code, wherein the at least one memory and the computer program code is configured to, with the at least one processor, cause the apparatus at least to
receive and store in the at least one memory an existing media content;
receive and store a first created media content, wherein the first created media content is synchronized with the existing media content by being associated with a first time within the existing media content, and the first created media content is playable for a first duration of time;
receive and store a second created media content, wherein the second created media content is synchronized with the existing media content by being associated with a second time within the existing media content, the second created media content is associated with an indicated time flexibility, the indicated time flexibility indicating an amount of time that the second created media content can be moved from the second time when arranging the second created media content relative to the existing media content, and the second created media content is playable for a second duration of time, wherein the first duration of time after the first time overlaps with the second duration of time after the second time, and the overlap results in a conflict between the first created media content and the second created media content;
generate an arrangement of media content at a time when the existing media is selected to be played, wherein the generating comprises selecting the first created media content as a selected content between the first created media content and the second created media content, the selected first created media content is prioritized over the unselected second created media content, and the selected content is associated with a third time within the existing media content, and the unselected content is associated with a fourth time within the existing media content, and the unselected content is arranged relative to the selected content such that the unselected content is outside of the duration of the selected content, and such that the difference between the second time and the fourth time is based on the indicated time flexibility, in order to resolve the conflict; and
play the arrangement of media content, wherein the playing comprises playing the existing media content and playing the selected content when the third time within the existing media content is reached when playing the existing media content, and the playing comprises playing the unselected content when the fourth time within the existing media content is reached.

8. The apparatus of claim 7, wherein the selecting the selected content is based on preferences of a user that selects the existing media to be played.

9. The apparatus of claim 7, wherein the existing media content corresponds to video content.

10. The apparatus of claim 7, wherein the apparatus is further caused to:
transmit an indication to a user that initiates playing of the existing content, after the user initiates playing of the existing content, that the selected content has been associated with the existing content.

11. The apparatus of claim 10, wherein the selected content comprises created media content that is created by a creator to which the user is subscribed to.

12. The apparatus of claim 7, wherein the selecting the selected content is based on input provided by other users regarding the first created media content and input provided by other users regarding the second created media content.

13. The apparatus of claim 7, wherein the generating the arrangement of media content comprises including the selected content within the arrangement of media content and not including the non-selected content within the arrangement.

14. A computer-implemented method, comprising:
receiving and storing in a memory an existing media content;
receiving and storing a first created media content, wherein the first created media content is synchronized with the existing media content by being associated with a first time within the existing media content, and the first created media content is playable for a first duration of time;
receiving and storing a second created media content, wherein the second created media content is synchronized with the existing media content by being associated with a second time within the existing media content, the second created media content is associated with an indicated time flexibility, the indicated time flexibility indicating an amount of time that the second created media content can be moved from the second time when arranging the second created media content relative to the existing media content, and the second created media content is playable for a second duration of time, wherein the first duration of time after the first time overlaps with the second duration of time after the second time, and the overlap results in a conflict between the first created media content and the second created media content;
generating an arrangement of media content at a time when the existing media is selected to be played, wherein the generating dynamically comprises selecting the first created media content as a selected content between the first created media content and the second created media content, the selected first created media content is prioritized over the unselected second created media content, and the selected content is associated with a third time within the existing media content, and the unselected content is associated with a fourth time within the existing media content, and the unselected content is arranged relative to the selected content such that the unselected content is outside of the duration of the selected content, and such that the difference between the second time and the fourth time is based on the indicated time flexibility, in order to resolve the conflict; and playing the arrangement of media content, wherein the playing comprises playing the existing media content and playing the selected content when the third time within the existing media content is reached when playing the existing media content, and the playing comprises playing the unselected content when the fourth time within the existing media content is reached.

15. The computer-implemented method of claim 14, wherein the selecting the selected content is based on preferences of a user that selects the existing media to be played.

16. The computer-implemented method of claim 14, wherein the existing media content corresponds to video content.

17. The computer-implemented method of claim 14, further comprising:

transmitting an indication to a user that initiates playing of the existing content, after the user initiates playing of the existing content, that the selected content has been associated with the existing content.

18. The computer-implemented method of claim 17, wherein the selected content comprises created media content that is created by a creator to which the user is subscribed to.

19. The computer-implemented method of claim 14, wherein the selecting the selected content is based on input provided by other users regarding the first created media content and input provided by other users regarding the second created media content.

* * * * *